US010865290B2

(12) United States Patent
Yam et al.

(10) Patent No.: US 10,865,290 B2
(45) Date of Patent: Dec. 15, 2020

(54) COMPOSITIONS AND METHODS RELATING TO LIVING SUPRAMOLECULAR POLYMERIZATION AND POLYMERS

(71) Applicant: The University of Hong Kong, Hong Kong (HK)

(72) Inventors: Vivian Wing-Wah Yam, Hong Kong (HK); Kaka Zhang, Hong Kong (HK); Yu-Lut Leung, Tseun Wan (HK); Margaret Ching-Lam Yeung, Hong Kong (HK); Kwun-Wa Chan, Kowloon (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 578 days.

(21) Appl. No.: 15/460,532

(22) Filed: Mar. 16, 2017

(65) Prior Publication Data

US 2017/0267837 A1 Sep. 21, 2017

Related U.S. Application Data

(60) Provisional application No. 62/308,948, filed on Mar. 16, 2016.

(51) Int. Cl.
*C08K 5/56* (2006.01)
*D01F 6/36* (2006.01)
*D01F 6/30* (2006.01)
*C08F 283/06* (2006.01)
*D01F 6/94* (2006.01)
*D01F 8/16* (2006.01)
*B82Y 40/00* (2011.01)
*B82Y 30/00* (2011.01)

(52) U.S. Cl.
CPC ............. *C08K 5/56* (2013.01); *C08F 283/06* (2013.01); *D01F 6/30* (2013.01); *D01F 6/36* (2013.01); *D01F 6/94* (2013.01); *D01F 8/16* (2013.01); *B82Y 30/00* (2013.01); *B82Y 40/00* (2013.01); *D10B 2331/06* (2013.01)

(58) Field of Classification Search
None
See application file for complete search history.

(56) References Cited

PUBLICATIONS

Robinson et al. Chem. Commun. 2015, 51, 15921-15924. (Year: 2015).*
Aida, et al., "Functional supramolecular polymers", Science 335(6070):813-7 (2012).
Bailey, et al., "Electronic Spectroscopy of Chloro(terpyridine)platinum(II)", Inorg. Chem., 34:4591-9 (1995).
Blake, et al., "Effects of Ligand Substituents (F for H; or for R) on Mesogenic Properties of M(Salen) Derivatives (M=Cu, Ni, VO). New Fluoro-Substituted Complexes and Crystal Structure of the Mesogen Ni(5-hexylSalen)", Inorg. Chem. 34:1125-9 (1995).
Brunsveld, et al., "Supramolecular polymers", Chem. Rev., 101(12):4071-98 (2001).
Casper, "Long-lived reactive excited states of zero-valent phosphine, phosphite, and arsine complexes of nickel, palladium and platinum", J. Am. Chem. Soc., 107:6718-9 (1985).
Chen, et al., "Strategies for Constructing Polymeric Micelles and Hollow Spheres in Solution via Specific Intermolecular Interactions", Acc. Chem. Res. 38:494-502 (2005).
Chen, et al., "Tetrakis(arylisocyanide) rhodium(I) salts in water: NIR luminescent and conductive supramolecular polymeric nanowires with hierarchical organization", Angew. Chem. Int. Ed. 49:9968-71 (2010).
Chung, et al., "Induced self-assembly and Förster resonance energy transfer studies of alkynylplatinum(II) terpyridine complex through interaction with water-soluble poly(phenylene ethynylene sulfonate) and the proof-of-principle demonstration of this two-component ensemble for selective label-free detection of human serum albumin", J. Am. Chem. Soc., 133:18775-84 (2011b).
Chung, et al., "Proof-of-principle concept for label-free detection of glucose and α-glucosidase activity through the electrostatic assembly of alkynylplatinum(II) terpyridyl complexes", Chem. Commun., 47:2000-2 (2011a).
Cui, et al., "Block copolymer assembly via kinetic control", Science, 317:647-50 (2007).
Davis, et al., "Atom Transfer Radical Polymerization of tert-Butyl Acrylate and Preparation of Block Copolymers", Macromolecules, 33(11):4039-47 (2000).
De Greef, et al., "Supramolecular polymerization", Chem. Rev. 109:5687-5754 (2009).
Dimitrov, et al., "Thermosensitive water-soluble copolymers with doubly responsive reversibly interacting entities", Prog. Polym. Sci., 32(11):1275-1343 (2007).
Fiore, et al., "Optically healable polymers", Chem. Soc. Rev., 42:7278-88 (2013).
Forster, et al., "Amphiphilic Block Copolymers in Structure-Controlled Nanomaterial Hybrids", Adv. Mater. 10:195-217 (1998).

(Continued)

*Primary Examiner* — Robert T Butcher
(74) *Attorney, Agent, or Firm* — Pabst Patent Group LLP

(57) ABSTRACT

A supramolecular polymer with living characteristics is provided based on small molecules or metal complexes of a planar or linear geometry and a polymer. The small molecules are solvophobic and can associate or assemble with each other through non-covalent interactions such as but not limited to metal-metal, π-π, hydrogen-bonding, and/or solvophobic-solvophobic interactions, in the modulation of the polymer. The polymer has affinity to the medium (e.g., solvent) and still interacts with the small molecules via non-covalent interactions such as electrostatic attractions to stabilize the associated/assembled small molecules. Varying the composition and/or length of the polymer can modulate the dimensions of the supramolecular polymer and the nanostructures therefrom. The two- or multi-component supramolecular polymer has active ends to support further supramolecular polymerization upon addition of small molecules of a planar or linear geometry. A process of two-component living supramolecular polymerization is also provided.

31 Claims, 18 Drawing Sheets

(56) References Cited

PUBLICATIONS

Fouquey, et al., "Molecular recognition directed self-assembly of supramolecular liquid crystalline polymers from complementary chiral components", Adv. Mater. 2(5):254-257 (1990).

Fox, et al., "Supramolecular Polymerizations and Main-Chain Supramolecular Polymers", Macromolecules,42:6823-35 (2009).

Gadt, et al., "Complex and hierarchical micelle architectures from diblock copolymers using living, crystallization-driven polymerizations", Nat Mater., 8:144-50 (2009).

Gillies, et al., "Stimuli-responsive supramolecular assemblies of linear-dendritic copolymers", J. Am. Chem. Soc. 126:11936-43 (2004).

Gilroy, et al., "Monodisperse cylindrical micelles by crystallization-driven living self-assembly", Nature Chemistry, 2:566-70 (2010).

Gu, et al., "Polymer Mortar Assisted Self-Assembly of Nanocrystalline Polydiacetylene Bricks Showing Reversible Thermochromism", Macromolecules, 41:2299-2303 (2008).

Guo, et al., "Non-covalently connected micelles (NCCMs): the origins and development of a new concept", Soft Matter, 5:495-500 (2009).

Harada, et al., "Chain length recognition: core-shell supramolecular assembly from oppositely charged block copolymers", Science, 283:65-7 (1999).

Harada, et al., "Supramolecular assemblies of block copolymers in aqueous media as nanocontainers relevant to biological applications", Prog. Polym. Sci., 31:949-82 (2006).

Houlding, et al., "The effect of linear chain structure on the electronic structure of pt(II) diimine complexes", Coord. Chem. Rev., 111:145-52 (1991).

Huang, et al., "Polymer-induced self-assembly of small organic molecules into ultralong microbelts with electronic conductivity", J. Am. Chem. Soc., 132:3700-7 (2010).

Jain, et al., "On the origins of morphological complexity in block copolymer surfactants", Science, 300:460-4 (2003).

Jankova, et al., "Synthesis of Amphiphilic PS-b-PEG-b-PS by Atom Transfer Radical Polymerization", Macromolecules , 31:538-41 (1998).

Kang, et al., "Noncovalent assembly. A rational strategy for the realization of chain-growth supramolecular polymerization", Science, 347:646-51 (2015).

Lehn, Supramolecular Chemistry—Scope and Perspectives Molecules, Supermolecules, and Molecular Devices (Nobel Lecture) Angew. Chem. Int. Ed. 27:89-112 (1988).

Li, et al., "Multicompartment micelles from ABC miktoarm stars in water", Science, , 306:98-101 (2004).

Li, et al., "Synthesis, Characterization, and the Photochromic, Luminescence, Metallogelation and Liquid-Crystalline Properties of Multifunctional Platinum(II) Bipyridine Complexes", Chem. Eur. J., 17:8048-59 (2011).

Liu, et al., "End coupling of block copolymer nanotubes to nanospheres", J. Am. Chem. Soc. 125: 14039-45 (2003).

Liu, et al., "N,N'-bis[3,3'-(dimethylamino)propylamine]-3,4,9, 10-perylenetetracarboxylic diimide, a dicationic perylene dye for rapid precipitation and quantitation of trace amounts of DNA", Anal. Biochem., 236:139-45 (1996).

Lu, et al., "Supramolecular polymers and chromonic mesophases self-organized from phosphorescent cationic organoplatinum(II) complexes in water", Angew. Chem. Int. Ed., 48: 7621-5 (2009).

Massey, et al., "Self-Assembly of a Novel Organometallic—Inorganic Block Copolymer in Solution and the Solid State: Nonintrusive Observation of Novel Wormlike poly(ferrocenyldimethylsilane)-b-Poly(dimethylsiloxane) Micelles", J. Am. Chem. Soc., 120:9533-40 (1998).

Miller, et al., "Synthesis, Characterization, and Reactivity of Palladium(II) Salen and Oxazoline Complexes", Inorg. Chem., 38:4510-14 (1999).

Miskowski, et al., "Electronic spectra and photophysics of platinum(II) complexes with .alpha.-diimine ligands solid-state effects. 2. Metal-metal interaction in double salts and linear chains", Inorg. Chem., 30:4446-52 (1991).

Miskowski, et al., "Electronic spectra and photophysics of platinum(II) complexes with .alpha.-diimine ligands. Solid-state effects. 1. Monomers and ligand .pi. dimers", Inorg. Chem., 28:1529-33 (1989).

Ogi, et al., "Living supramolecular polymerization realized through a biomimetic approach", Nature Chemistry 6:188-95 (2014).

Po, et al., "Supramolecular self-assembly of amphiphilic anionic platinum(II) complexes: a correlation between spectroscopic and morphological properties", J. Am. Chem. Soc., 133:12136-43 (2011).

Po, et al., "Tuning of spectroscopic properties via variation of the alkyl chain length: a systematic study of molecular structural changes on self-assembly of amphiphilic sulfonate-pendant platinum(II) bzimpy complexes in aqueous medium", Chem. Sci., 5:2688-95 (2014).

Qiu, et al., "Micelle assembly. Multidimensional hierarchical self-assembly of amphiphilic cylindrical block comicelles", Science, 347:1329-32 (2005).

Roundhill, et al., "Pyrophosphito-bridged diplatinum chemistry", Acc. Chem. Res., 22:55-61 (1989).

Tam, et al., "Luminescent alkynylplatinum(II) terpyridyl metallogels stabilized by Pt . . . Pt, pi-pi, and hydrophobic-hydrophobic interactions", Langmuir, 25:8685-95 (2009b).

Tam, et al., "Luminescent metallogels of platinum(II) terpyridyl complexes: interplay of metal⋯metal, π–π and hydrophobic-hydrophobic interactions on gel formation", Chem. Commun., 20:2028-30 (2007).

Tam, et al., "Recent advances in metallogels", Chem. Soc. Rev., 42:1540-67 (2013).

Tam, et al., "Unusual luminescence enhancement of metallogels of alkynylplatinum(II) 2,6-bis(N-alkylbenzimidazol-2'-yl)pyridine complexes upon a gel-to-sol phase transition at elevated temperatures", J. Am. Chem. Soc., 131:6253-60 (2009).

Thünemann, et al., "Alpha-helical-within-discotic columnar structures of a complex between poly(ethylene oxide)-block-poly(l-lysine) and a hexa-peri-hexabenzocoronene", J. Am. Chem. Soc., 125:352-6 (2003).

Vanhest, et al., "Polystyrene-dendrimer amphiphilic block copolymers with a generation-dependent aggregation", Science, 268:1592-5 (1995).

Wang, et al., "Cylindrical block copolymer micelles and co-micelles of controlled length and architecture", Science, 317:644-7 (2007).

Wang, et al., "Fluorescence turn-on detection of a protein through the reduced aggregation of a perylene probe", Angew. Chem. Int. Ed., 49:1485-8 (2010).

Wong, et al., "Self-Assembly of Luminescent Alkynylplatinum(II) Terpyridyl Complexes: Modulation of Photophysical Properties through Aggregation Behavior", Acc. Chem. Res., 44: 424-34 (2011).

Xiao, et al., "Phosphorescent nematic hydrogels and chromonic mesophases driven by intra- and intermolecular interactions of bridged dinuclear cyclometalated platinum(II) complexes", Chem. Sci., 5:2482-8 (2014).

Yam, et al., "Light-Emitting Self-Assembled Materials Based on d(8) and d(10) Transition Metal Complexes", Chem. Rev., 115:7589-728 (2015).

Yam, et al., "Solvent-induced aggregation through metal . . . metal/pi . . . pi interactions: large solvatochromism of luminescent organoplatinum(II) terpyridyl complexes", J. Am. Chem. Soc., 124:6506-7 (2002).

Yam, et al., "Synthesis, Luminescence, Electrochemistry, and Ion-Binding Studies of Platinum(II) Terpyridyl Acetylide Complexes", Organometallics 20:4476-82 (2001).

Yang, et al., "Supramolecular Polymers: Historical Development, Preparation, Characterization, and Functions", Chem. Rev., 115:7196-239 (2015).

Yeung, et al., "Anion Binding Properties of Alkynylplatinum(II) Complexes with Amide-Functionalized Terpyridine: Host-Guest Interactions and Fluoride Ion-Induced Deprotonation", ChemistryOpen, 3:172-6 (2014).

(56) References Cited

PUBLICATIONS

Yip, et al., "Luminescent platinum(II) complexes. Electronic spectroscopy of platinum(II) complexes of 2,2':6',2"-terpyridine (terpy) and p-substituted phenylterpyridines and crystal structure of [Pt(terpy)Cl][CF3SO3]", J. Chem. Soc. Dalton Trans., 2933-38 (1993).

Yu, et al., "Single-stranded nucleic acid-induced helical self-assembly of alkynylplatinum(II) terpyridyl complexes", PNAS, 103:19652-7 (2006).

Yuen, et al., "Semiconducting and electroluminescent nanowires self-assembled from organoplatinum(II) complexes", Angew. Chem. Int. Ed., 47:9895-9 (2008).

Zhang, et al., "Formation of crew-cut aggregates of various morphologies from amphiphilic block copolymers in solution", Polym. Adv. Technol., 9:677-99 (1998).

Zhang, et al., "Multiple Morphologies of "Crew-Cut" Aggregates of Polystyrene-b-poly(acrylic acid) Block Copolymers" Science 268:1728-31 (1995).

Zipp, "The behavior of the tetra-∪-pyrophosphito-diplatinum(II) ion Pt2(P2O5H2)4-4 and related species", Coord. Chem. Rev., 84:47-83 (1988).

Zhang, et al., "Manipulations of Nanostructures in the Co-assembly of Platinum (II) Complexes and Block Copolymers"—Chen, 2:825-39 (2017).

Zhang, et al., "Living Supramolecular Polymerization Achieved by Collaborative Assembly of Platinum (II) Complexes and Block Copolymers"—PNAS, 114(45):11844-9 (2017) Science, 268:1728-31 (1995).

Zhang, et al., "Energy Landscape in SUpramolecular Co-assembly of Platinum (II) Complexes and Polymers: Morphological Diversity, Transformation and Dilutions Stability of Nanostructures"—JACS, 140:9594-9605 (2018).

* cited by examiner

US 10,865,290 B2

COMPOSITIONS AND METHODS RELATING TO LIVING SUPRAMOLECULAR POLYMERIZATION AND POLYMERS

CROSS-REFERENCE TO RELATED APPLICATIONS

This application claims benefit of U.S. Provisional Application No. 62/308,948, filed Mar. 16, 2016. Application No. 62/308,948, filed Mar. 16, 2016, is hereby incorporated herein by reference in its entirety.

FIELD OF THE INVENTION

The disclosed invention is generally in the field of supramolecular polymerization and specifically in the area of assembly of planar small molecules into supramolecular polymers that exhibit living characteristics.

BACKGROUND OF THE INVENTION

Development of methods that can make molecular, macromolecular and nanoparticulate assemblies with controlled dimensions, ordered structures and complexity through non-covalent interactions is a major theme of supramolecular chemistry and nanotechnology. Supramolecular polymerization is one route to connect building blocks with one another through non-covalent interactions. The building blocks can be molecules, macromolecules, or nanoparticles. The supramolecular polymers formed can be coiled chains connected by non-covalent interactions, nanofibers of peptide amphiphiles, worm-like micelles of block copolymers, or one-dimensional nanoparticulate assemblies (Lehn J M, *Angew. Chem. Int. Ed.* 27:89-112 (1988); Fouquey C, et al., *Adv. Mater.* 2(5):254-257 (1990); Brunsveld L, et al., *Chem. Rev,* 101(12):4071-4098 (2001); De Greef T F A, et al., *Chem. Rev.* 109:5687-5754 (2009); Aida T, et al., *Science* 335 (6070):813-817 (2012); Fox J D, et al., Macromolecules, 42, 6823 (2009); Fiore G L, et al., *Chem. Soc. Rev,* 42, 7278 (2013); Yang L L, et al., *Chem. Rev,* 115, 7196 (2015)).

One type of supramolecular polymerization, i.e., living supramolecular polymerization, has recently received a great research interest. Here, during supramolecular polymerization, the ends of the propagating supramolecular polymers are active; and after supramolecular polymerization, the ends of the supramolecular polymers formed remain active. Addition of extra monomers resumes the supramolecular polymerization to produce a longer supramolecular polymer. Living supramolecular polymerization thus allows the preparation of supramolecular polymers with controlled dimensions and different architectures.

For instance, Manners and coworkers have developed living crystallization-driven self-assembly (CDSA) of diblock copolymers containing crystallizable polyferrocenyldimethylsilane (PFS) (Wang X, et al., *Science,* 317, 644 (2007)). In a selective solvent, the PFS-containing diblock copolymers are described to form cylindrical micelles with PFS cores through a heating-cooling process. Addition of unimers of PFS-containing diblock copolymers is said to lead to the epitaxial growth of the cylindrical micelles at both ends. In contrast, addition of unimers of PFS-containing diblock copolymers into pure selective solvents is said to only lead to the formation of irregular amorphous aggregates. With CDSA, cylindrical micelles with controlled lengths and narrow length distributions are obtained, and cylindrical block comicelles with certain block lengths and defined architectures are prepared (Gilroy J B, et al., *Nature Chemistry,* 2, 566 (2010); Gadt T, et al., *Nature Materials,* 8, 144 (2009); Qiu H, et al., *Science,* 347, 1329 (2005)). In CDSA, only a single-component system is involved in the formation of the cylindrical micelles and the formation of each block of the cylindrical block co-micelles.

In another instance, Takeuchi and coworkers have reported a living supramolecular polymerization based on a single-component self-assembly of porphyrin-based monomers (Ogi S, et al., *Nature Chemistry* 6, 188 (2014)). At room temperature, the porphyrin-based monomers are said to form J-aggregates with a spherical nanoparticle morphology, which gradually converts to H-aggregates with a nanofiber morphology by standing for several days. The J-aggregates are described to be kinetic metastable products, whereas the H-aggregates are said to be thermodynamically stable. Interestingly, at room temperature, in the presence of an aliquot of H-aggregates, the J-aggregates of porphyrin-based monomers are described to convert into H-aggregates in several hours. In other words, the nanofibers of H-aggregates seem to serve as seeds to direct the growth of porphyrin-based monomers at both ends of the nanofibers. Through this mechanism, the transformation of J-aggregates into H-aggregates appears to be much faster.

In yet another instance, Aida and coworkers have studied chain-growth supramolecular polymerization of a specific monomer and a specific initiator, both carrying a similar chemical structure of a corannulene core with five amide-appended thioalkyl side chains (Kang J, et al., *Science,* 347, 646 (2015)). The monomers are metastable, adopting a cage-like closed conformation that is conformationally restricted from spontaneous polymerization at room temperature. The initiator is said to interact with the monomer via multiple hydrogen bonding to open the closed conformation of the monomer and start the chain-growth supramolecular polymerization. Although this living supramolecular polymerization process involves two components (the initiator and the monomer), the two components possess very similar chemical structures. To date, living supramolecular polymerization based on self-assembly of two components with unlike structures has not been reported.

According to the abovementioned description, methods of living supramolecular polymerization are limited to a few examples. In these reported methods, the living supramolecular polymerizations are based on single-component systems or two-component systems of initiator and monomer with very similar structures. The works by Manners, Takeuchi, and Aida are greatly dependent on the chemical structures and configurations of certain specific molecules or macromolecules to realize living supramolecular polymerization. Therefore, limited types of supramolecular monomers may be applicable in living supramolecular polymerization.

Alternatively, $d^8$ and $d^{10}$ metal complexes have been studied for self-assembly behaviors (Yam V W W, et al., *Chem. Rev,* 115, 7589 (2015)). For example, platinum(II) polypyridine complexes have been reported to exhibit intriguing spectroscopic and luminescence properties and a propensity to form highly ordered extended linear chains or oligomeric structures in the solid state based on non-covalent metal-metal and $\pi$-$\pi$ interactions. (Miskowski V M, et al., *Inorg. Chem.,* 28, 1529 (1989); Miskowski V M, et al., *Inorg. Chem.,* 30, 4446 (1991); Houlding V H, et al., *Coord. Chem. Rev,* 111, 145 (1991); Bailey J A, et al., *Inorg. Chem.,* 34, 4591 (1995); Yip H K, et al., *J. Chem. Soc. Dalton Trans.,* 2933 (1993); Wong K M C, et al., et al., *Acc. Chem. Res.,* 44, 424 (2011)). With introduction of alkynyl ligand in place of chloro ligand, alkynylplatinum(II) terpyridine complexes were found to be more soluble and aggregation through non-covalent metal-metal and π-π interactions was observed upon addition of non-solvents (Yam V W W, et al., *J. Am. Chem. Soc.*, 124, 6506 (2002)). Polyelectrolytes are studied for inducing aggregation and self-assembly of oppositely charged platinum(II) complexes in a solution state, giving rise to drastic spectroscopic changes (Yu C, et al., *Angew. Chem. Int. Ed.*, 117, 801 (2005); Yu C, et al., *Proc. Natl. Acad. Sci. USA*, 103, 19652 (2006); Chung C Y S, et al., *J. Am. Chem. Soc.*, 133, 18775 (2011); Chung C Y S, et al., *Chem. Commun.*, 47, 2000 (2011)). In these polyelectrolyte-platinum(II) complex systems, both the electrostatic attractions between polyelectrolytes and platinum(II) complexes and the metal-metal interactions are responsible for the aggregation of the platinum(II) complexes. As the self-assembly was performed in solvents that have a high solubility for the platinum(II) complexes, the non-covalent metal-metal and π-π interactions between the platinum(II) complexes are not strong enough to direct supramolecular polymerization of the platinum(II) complexes, and thus no living supramolecular polymerization of the polyelectrolyte-platinum(II) complexes has been observed.

Platinum(II) complexes decorated with long alkyl chains have been reported to form single-component supramolecular gels based on metal-metal interactions and hydrophobic-hydrophobic interactions of long alkyl chains (Tam A Y Y, et al., *Chem. Commun.*, 2028 (2007); Tam A Y Y, et al., *J. Am. Chem. Soc.*, 131, 6253 (2009); Tam A Y Y, et al., *Chem. Soc. Rev,* 42, 1540 (2013); Li Y G et al., *Chem. Eur. J.* 17, 8048 (2011); Tam A Y Y, et al., *Langmuir*, 25, 8685 (2009)). Che and coworkers have reported the supramolecular polymerization of platinum(II) complex monomers at concentrated solutions (Lu W, et al., *Angew. Chem. Int. Ed.*, 48, 7621 (2009)). By introducing a certain amount of dinuclear platinum(II) complexes into the concentrated solutions of mononuclear platinum(II) complexes, supramolecular gels of less well-defined structures and dimensions may be formed, but no living supramolecular polymerization has been observed for mononuclear, dinuclear, or their solution mixtures (Xiao X S, et al., *Chem. Sci.*, 5, 2482 (2014)). Nanowires of platinum(II) complexes may be prepared via nanoprecipitation, i.e., by injecting the platinum(II) complex solution into water (water is a non-solvent for the platinum (II) complex) (Yuen M Y, et al., *Angew. Chem. Int. Ed.*, 47, 9895 (2008)). Metal complex-based amphiphiles have also been reported to undergo single-component self-assembly into various nanostructures in selective solvents (Po C, et al., *J. Am. Chem. Soc.*, 133, 12136 (2011); Po C, et al., *Chem. Sci.*, 5, 2688 (2014)), but they lack living polymerization characteristics.

In the area of macromolecular self-assembly, most strategies to prepare polymeric micelles are based on block copolymers (Zhang L F, et al., *Science* 1995, 268, 1728; Zhang L F, et al., *Polym. Adv. Technol.* 1998, 9, 677; Forster S, et al., *Adv. Mater.* 1998, 10, 195; Massey J, et al., *J. Am. Chem. Soc.* 1998, 120, 9533; Liu G J, et al., *J. Am. Chem. Soc.* 2003, 125, 14039; Harada A, et al., *Science* 1999, 283, 65; Harada A, et al., *Prog. Polym. Sci.* 2006, 31, 949; Jain S, et al., *Science,* 2003, 300, 460; Li Z B, et al., *Science,* 2004, 306, 98; Vanhest J C M, et al., *Science*, 1995, 268, 1592; Gillies E R, et al., *J. Am. Chem. Soc.* 2004, 126, 11936; Cui H G, et al., *Science* 2007, 317, 647; Chen D Y, et al., *Acc. Chem. Res.* 2005, 38, 494; Dimitrov I, et al., *Prog. Polym. Sci.* 2007, 32, 1275). Jiang and coworkers developed "block copolymer free strategy" to prepare polymeric micelles using pairs of complementary polymers as building blocks (Guo M, et al., *Soft Matter,* 2009, 5, 495). This strategy has been extended to the systems of polymer-small molecule pairs and polymer-nanoparticle pairs. This strategy requires less synthetic effort to obtain a series of combination of assemblies, and provides ease of fabrication of supramolecular materials with stimuli-responsive properties. However, this strategy has not been used to design systems of living supramolecular polymerization. Yet another system based on polymer-small molecule pairs allows for the modulation of the behaviors of crystallization of small molecules by polymers, e.g., polymers stabilizing small molecule aggregates via hydrogen bonding, polymers-induced self-assembly of small organic molecules, and polymer-small molecule α-helical-within-discotic columnar structures for thermotropic liquid crystalline properties (Gu Y, et al., *Macromolecules* 2008, 41, 2299; Huang M, et al., *J. Am. Chem. Soc.* 2010, 132, 3700; Thunemann A F, et al., *J. Am. Chem. Soc.* 2003, 125, 352). No living characteristics have been reported for these supramolecular polymerization compositions.

It is therefore an object of the present invention to provide supramolecular polymers with diverse compositions, intriguing properties, controlled dimensions and different architectures through living supramolecular polymerization, and their applications in various fields.

It is another object of the present invention to provide a process of supramolecular polymerization with living characteristics based on two-component self-assembly of small molecules and polymers.

BRIEF SUMMARY OF THE INVENTION

A supramolecular polymer having active ends for polymer propagation or elongation (of a same composition or by introducing a new compositional block), i.e., living supramolecular polymer, is provided. The supramolecular polymer contains non-covalently associated (e.g., assembled) planar or linear small molecules, based on metal-metal interactions, π-π interactions, hydrogen-bonding interactions, solvophobic-solvophobic interactions, or a combination thereof, which are stabilized by a polymer via a non-covalent interaction including electrostatic attractions with the planar or linear small molecules. The disclosed supramolecular polymer can have a nano- and/or micro-structure such as nanofibers, nanorods, nano-belts, nano-ribbons, and nano-wires whose width is in the nanometer range with a length from nanometers to microns or even millimeters. The disclosed supramolecular polymer contains active ends that are capable of propagation or elongation upon addition of the same or different planar or linear small molecules. Therefore, the disclosed supramolecular polymer can be a supramolecular homopolymer with controlled dimensions and various compositions or a supramolecular block copolymer with heterojunctions.

A process for in-solution living supramolecular polymerization of small molecules modulated by polymers is also provided. The supramolecular polymerization process involves at least two components, a small-molecule component with planar or linear geometry that is solvophobic and a polymer component that is solvophilic. Solvent is selected such that the small-molecule component with planar or linear geometry is solvophobic and exhibits a strong interaction to permit supramolecular polymerization of the small-molecule component in the presence of the solvophilic polymer component. In an aqueous medium, the planar or linear small molecule is hydrophobic, while the polymer component is hydrophilic and soluble in water. Non-covalent metal-metal interactions, π-π interactions, hydrogen-bonding interactions, solvophobic-solvophobic (or hydrophobic-hydrophobic) interactions, or a combination of different interactions between the planar or linear small molecules direct the growth of supramolecular polymers; and the polymer component interacts with the planar or linear small molecules non-covalently and stabilizes the supramolecular polymers formed. After supramolecular polymerization, the ends of the supramolecular polymers remain active. Addition of extra monomers resumes the supramolecular polymerization to produce a longer supramolecular polymer, and adding different monomers produces a supramolecular block copolymer or a multi-component supramolecular polymer with heterojunctions.

The disclosed process can be used to prepare supramolecular polymers and supramolecular block copolymers with various compositions, controlled dimensions and different architectures. Formed supramolecular polymers exhibit rich spectroscopic and luminescence properties and other functional properties. In some forms, the supramolecular polymers have more absorption in the visible region and show much stronger emission in the near-infrared region, compared to the monomeric small-molecule metal complex, e.g., platinum(II) complexes.

Unlike existing techniques relying on single-component systems, the disclosed process using at least two chemically diverse components endows the process with a great flexibility and a large variety of choices of planar small molecules as the building blocks for the supramolecular polymer. The small-molecule component and the polymer component can be designed and synthesized independently. Many metal complexes of square-planar, trigonal-planar and linear configurations as well as planar organic molecules, which show strong tendency to associate with each other through non-covalent metal-metal interactions, π-π interactions, hydrogen-bonding interactions, solvophobic-solvophobic (or hydrophobic-hydrophobic) interactions, or a combination of different interactions, can be polymerized supramolecularly.

The process allows facile control of the lengths and diameters of the two-component supramolecular polymers. Addition of different supramolecular monomers to the two-component system can lead to multi-component supramolecular block copolymers. The lengths of the two- or multi-component supramolecular polymers can be controlled by the feed ratios of the small-molecule components to the polymer components, and the diameters can be controlled by the structural parameters of the polymer components.

The living characteristics of the disclosed supramolecular polymer can have neighboring blocks connected with each other via heterojunctions, upon sequential addition of two or more small-molecule components. Each block of the supramolecular block copolymers is generally formed based on coassembly of the small-molecule components and the polymer components. This is unlike existing single-component techniques for living supramolecular polymerizations where each step for block formation is based on the self-assembly of only one component, i.e., supramolecular monomer.

The disclosed two-component supramolecular polymers in the solution state exhibit "self-healing" properties. The two-component supramolecular polymers in an aqueous solution can be broken into pieces by mechanical forces such as shearing, and/or acoustic perturbation such as sonication; and after removal of the mechanical forces or acoustic perturbation, the pieces after incubation for a period of time generally lead to recovered two-component supramolecular polymers.

Additional advantages of the disclosed method and compositions will be set forth in part in the description which follows, and in part will be understood from the description, or may be learned by practice of the disclosed method and compositions. The advantages of the disclosed method and compositions will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed method and compositions.

(0.015 mM)+PEG$_{45}$-b-PAA$_{69}$ ([carboxylic acid]=1 mM) in aqueous solution (FIG. 16), prepared from complex 1 (0.06 mM)+PEG$_{45}$-b-PAA$_{69}$ ([carboxylic acid]=1 mM) in aqueous solution (FIG. 17), and prepared from complex 1 (0.12 mM)+PEG$_{45}$-b-PAA$_{69}$ ([carboxylic acid]=1 mM) in aqueous solution (FIG. 18), respectively. (Entry nos. 2-4 in Table 1, respectively: Complex 1 is shown in Formula 2 and the anion, X$^-$, is triflate, OTf$^-$).

Figure 19:
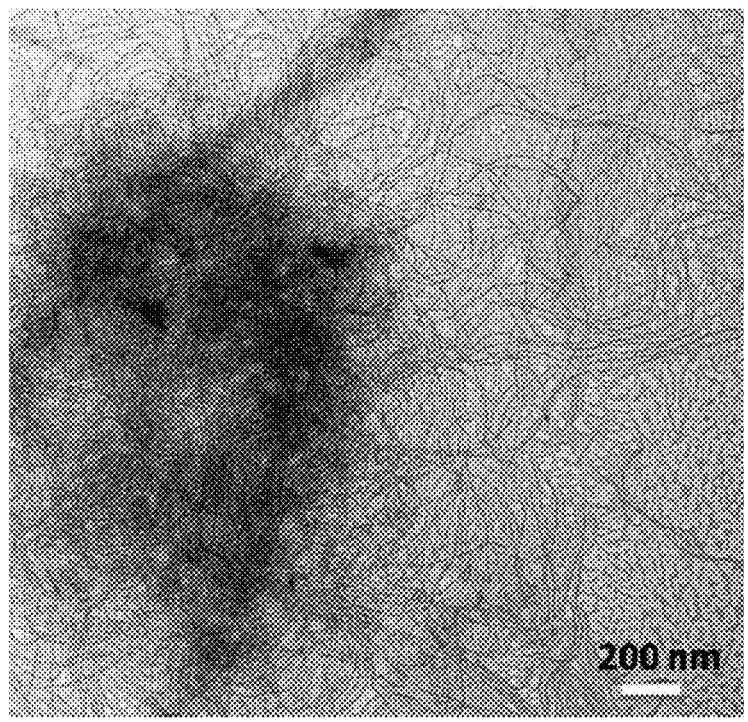
Figure 20:
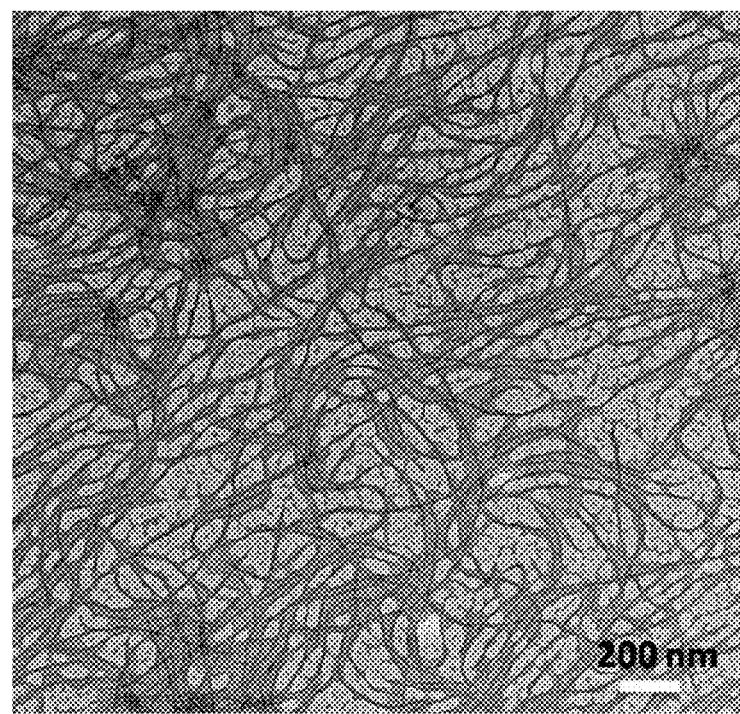

FIGS. 19 and 20 show the TEM images of supramolecular polymers of complex 1, prepared from complex 1 (0.15 mM)+PEG$_{45}$-b-PAA$_{30}$ ([carboxylic acid]=1 mM) in aqueous solution (FIG. 19) and prepared from complex 1 (0.15 mM)+PEG$_{45}$-b-PAA$_{45}$ ([carboxylic acid]=1 mM) in aqueous solution (FIG. 20), respectively. (Entry nos. 5 and 6 in Table 1, respectively: Complex 1 is shown in Formula 2 and the anion, X$^-$, is triflate, OTf$^-$).

Figure 21:
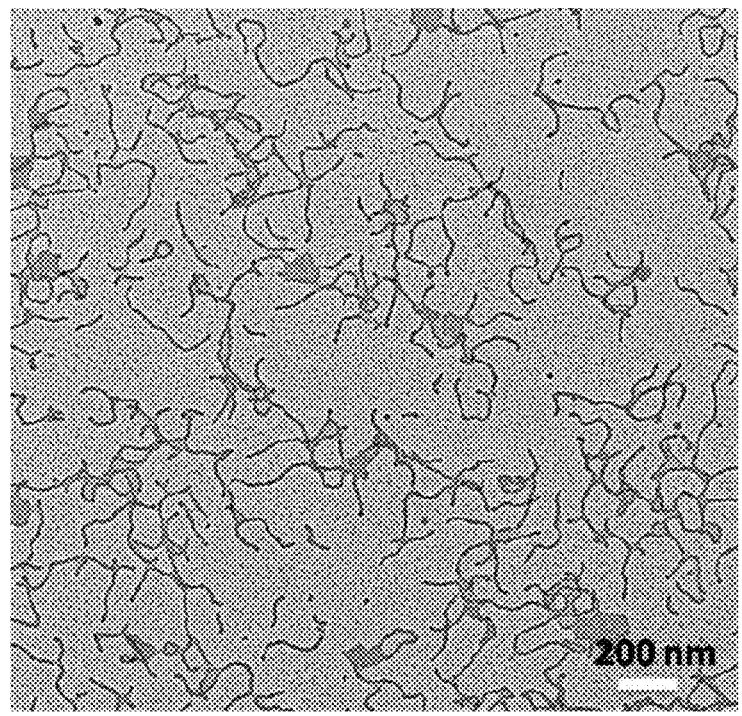

FIG. 21 shows the TEM image of supramolecular polymers of complex 2, prepared from complex 2 (0.25 mM)+PEG$_{45}$-b-PAA$_{69}$ ([carboxylic acid]=1.1 mM) in aqueous solution. (Entry no. 7 in Table 1: Complex 2 is shown in Formula 3 and the anion, X$^-$, is triflate, OTf$^-$.

Figure 22:
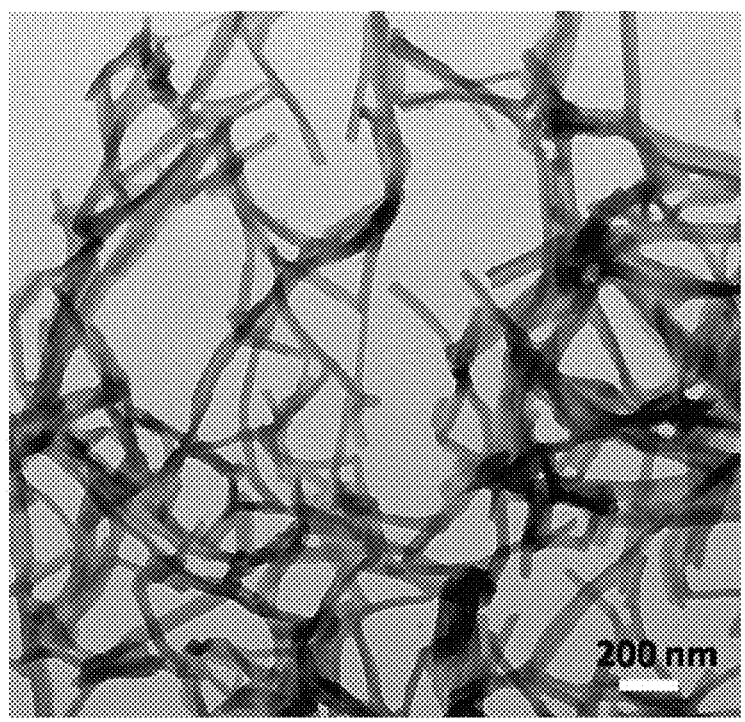

FIG. 22 shows the TEM image of supramolecular polymers of complex 3, prepared from complex 3 (0.11 mM)+PEG$_{45}$-b-PAA$_{69}$ ([carboxylic acid]=1 mM) in aqueous solution. (Entry no. 8 in Table 1: Complex 3 is shown in Formula 4 and the anion, X$^-$, is hexafluorophosphate, PF$_6^-$).

Figure 23:
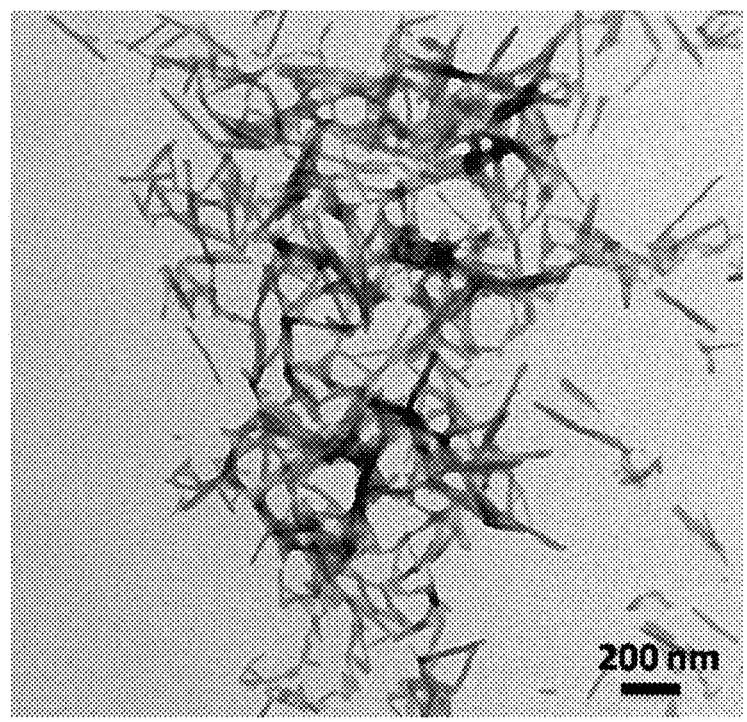

FIG. 23 shows the TEM image of supramolecular polymers of complex 4, prepared from complex 4 (0.098 mM)+PEG$_{45}$-b-PAA$_{69}$ ([carboxylic acid]=1 mM) in aqueous solution. (Entry no. 9 in Table 1: Complex 4 is shown in Formula 6).

Figure 24:
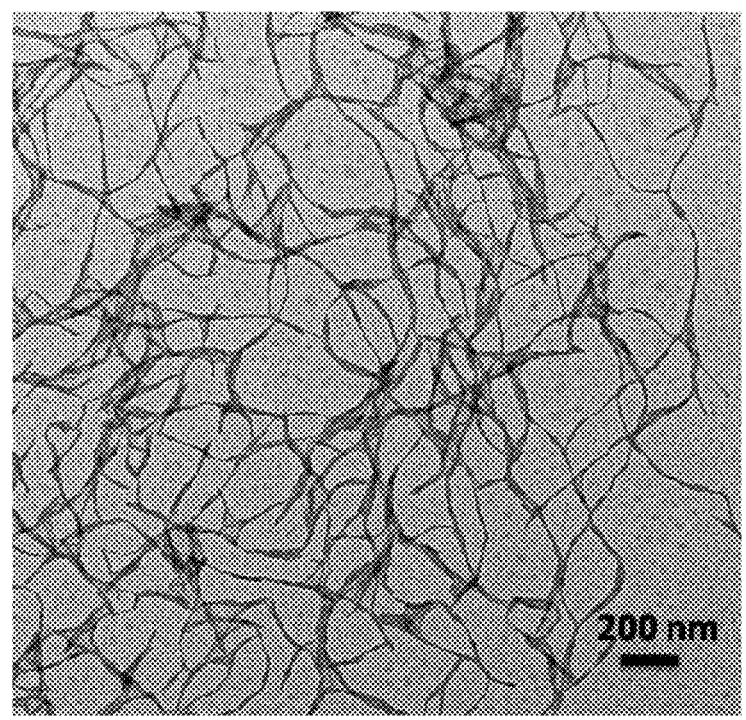

FIG. 24 shows the TEM image of supramolecular polymers of complex 5, prepared from complex 5 (0.12 mM)+PEG$_{45}$-b-PAA$_{69}$ ([carboxylic acid]=1 mM) in aqueous solution. (Entry no. 10 in Table 1: Complex 5 is shown in Formula 7).

Figure 25:
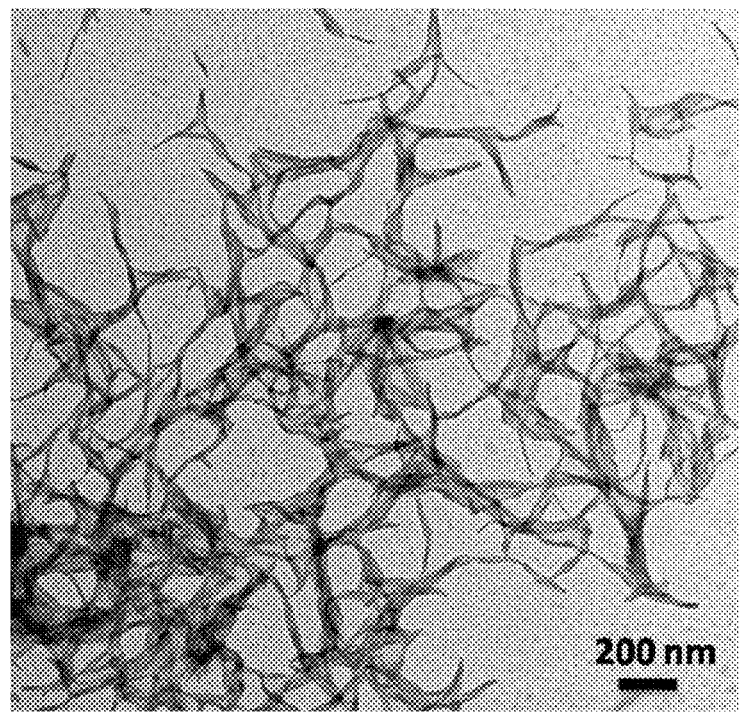

FIG. 25 shows the TEM image of supramolecular polymers of complex 6, prepared from complex 6 (0.11 mM)+PEG$_{45}$-b-PAA$_{69}$ ([carboxylic acid]=1 mM) in aqueous solution. (Entry no. 11 in Table 1: Complex 6 is shown in Formula 8).

Figure 26:
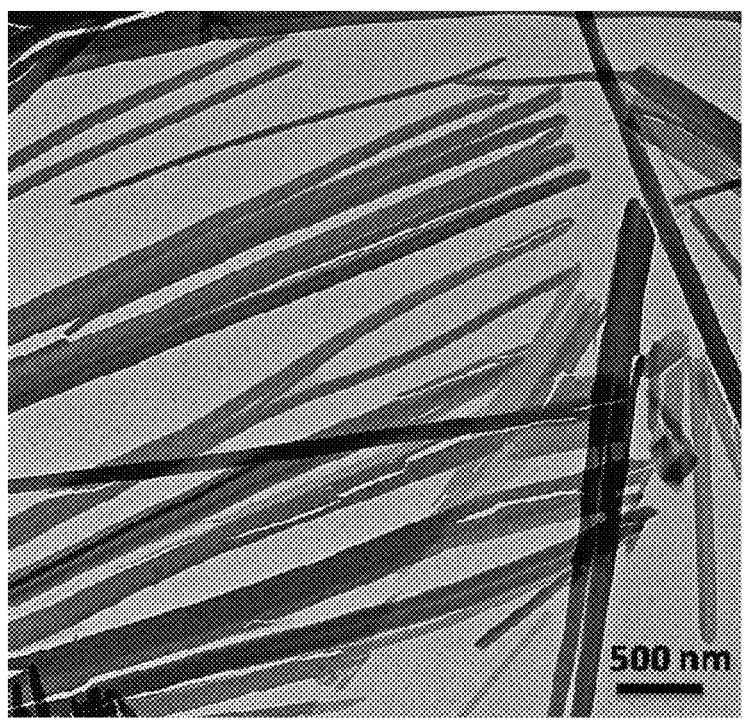

FIG. 26 shows the TEM image of supramolecular polymers of complex 7, prepared from complex 7 (0.24 mM)+PEG$_{45}$-b-PAA$_{69}$ ([carboxylic acid]=1 mM) in aqueous solution. (Entry no. 12 in Table 1: Complex 7 is shown in Formula 9).

Figure 27:
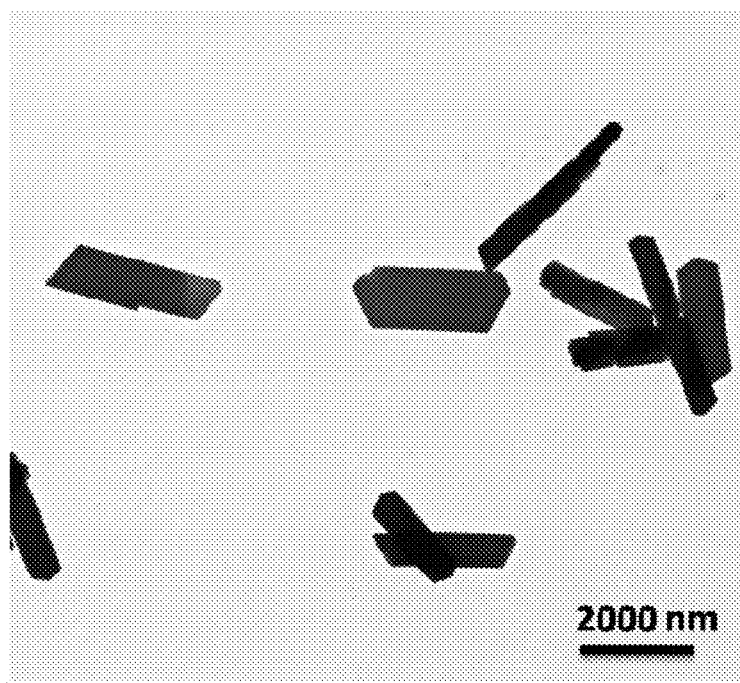

FIG. 27 shows the TEM image of supramolecular polymers of complex 8, prepared from complex 8 (0.24 mM)+PEG$_{45}$-b-PAA$_{69}$ ([carboxylic acid]=1.8 mM) in aqueous solution. (Entry no. 13 in Table 1: Complex 8 is shown in Formula 10).

Figure 28:
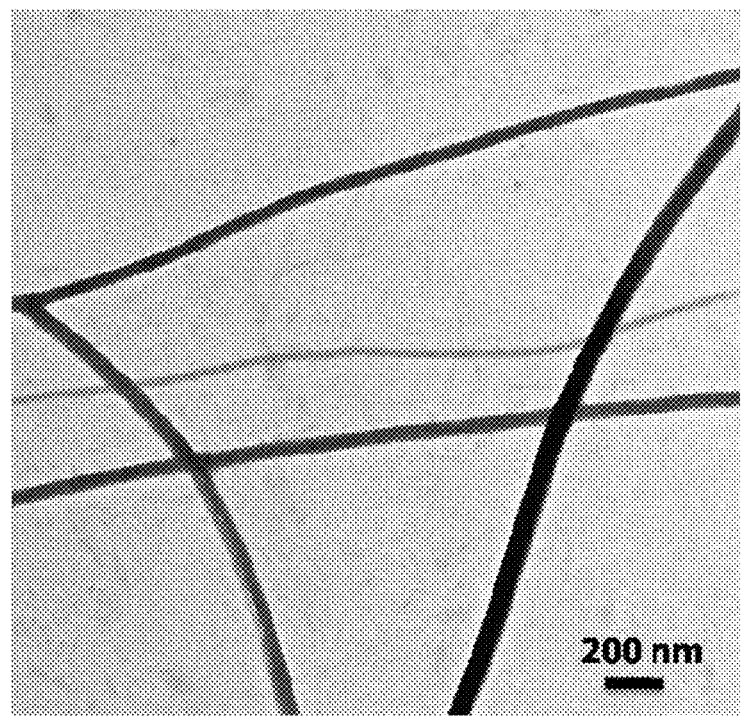

FIG. 28 shows the TEM image of supramolecular polymers of complex 9, prepared from complex 9 (1.5 mM)+PEG$_{45}$-b-PAA$_{69}$ ([carboxylic acid]=10 mM) in aqueous solution. (Entry no. 14 in Table 1: Complex 9 is shown in Formula 11).

Figure 29:
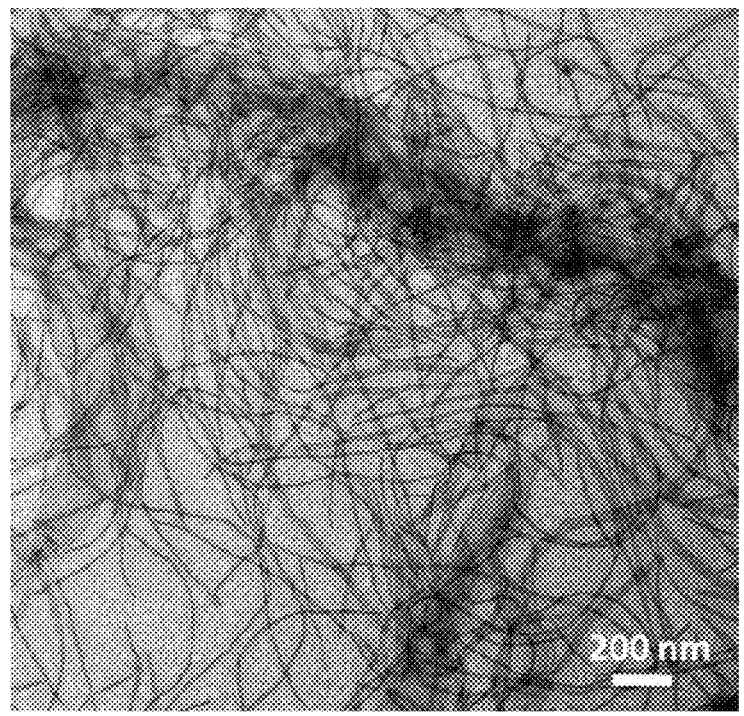

FIG. 29 shows the TEM image of supramolecular polymers formed by addition of complex 1 into supramolecular polymer seeds of complex 1 and incubation for 1 day. The polymer seeds were prepared from complex 1 (0.06 mM)+PEG$_{45}$-b-PAA$_{69}$ ([carboxylic acid]=1 mM) in aqueous solution. (Entry no. 15 in Table 1).

Figure 30:
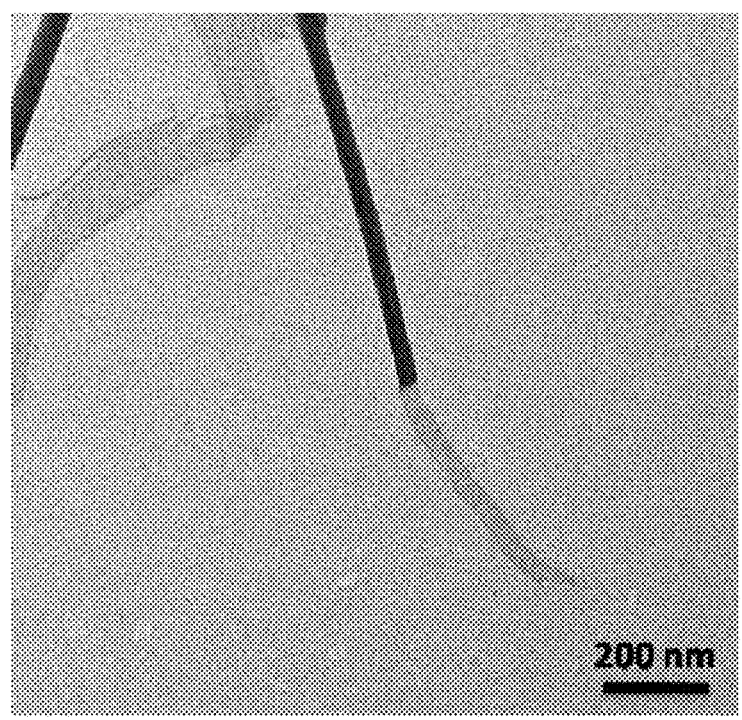

FIG. 30 shows the TEM image of supramolecular polymers formed by addition of complex 1 into supramolecular polymer seeds of complex 3 and incubation for 1 day. The polymer seeds were prepared from complex 3 (0.11 mM)+PEG$_{45}$-b-PAA$_{69}$ ([carboxylic acid]=1 mM) in aqueous solution. (Entry no. 16 in Table 1).

Figure 31:
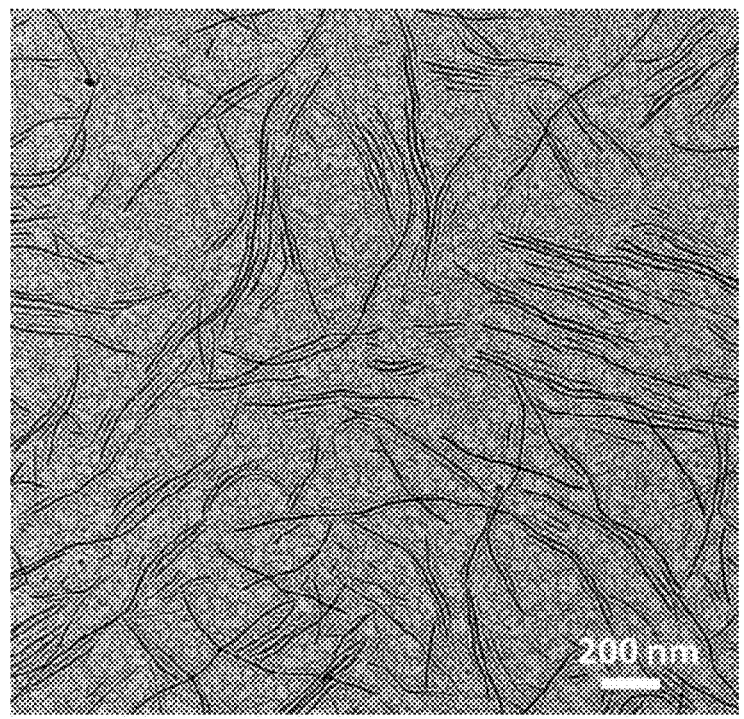
Figure 32:
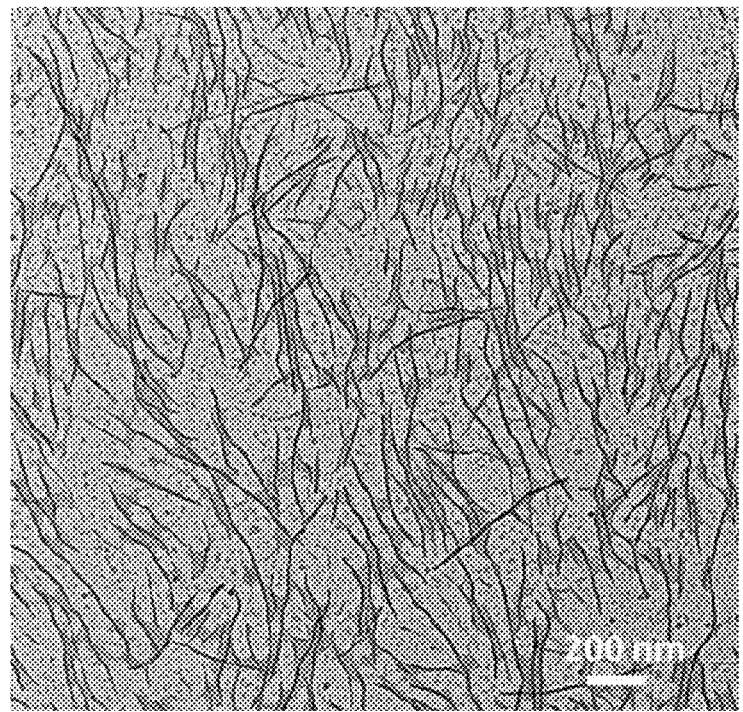
Figure 33:
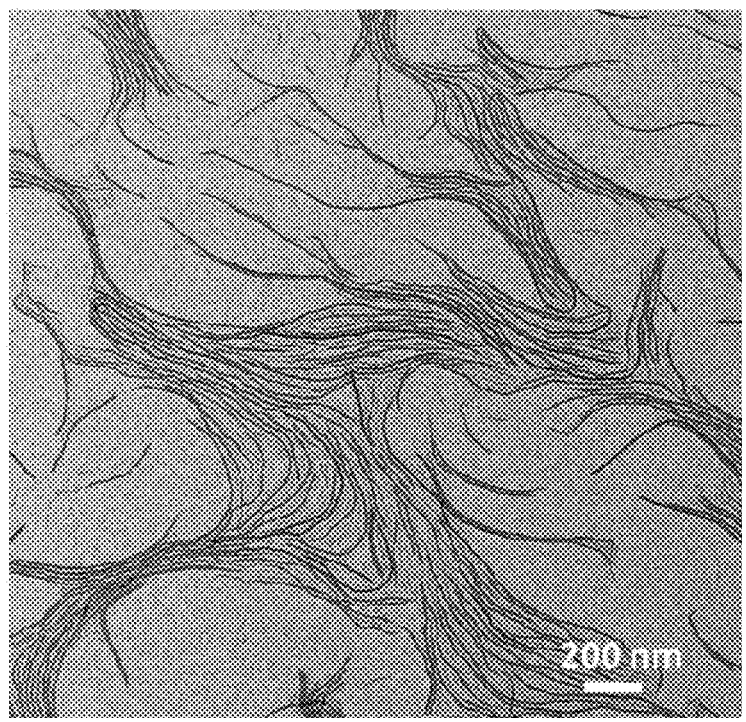

FIGS. 31, 32 and 33 show the TEM images of supramolecular polymers of complex 1 prepared from complex 1 (0.15 mM)+PEG$_{113}$-b-PAA$_{51}$ ([carboxylic acid]=1 mM) in aqueous solution (FIG. 31), the pieces formed by sonication treatment of the supramolecular polymers of complex 1+PEG$_{113}$-b-PAA$_{51}$ (FIG. 32), and the supramolecular polymers formed by incubation of the pieces for 5 days (FIG. 33), respectively. (Entry no. 17 in Table 1).

Figure 34:
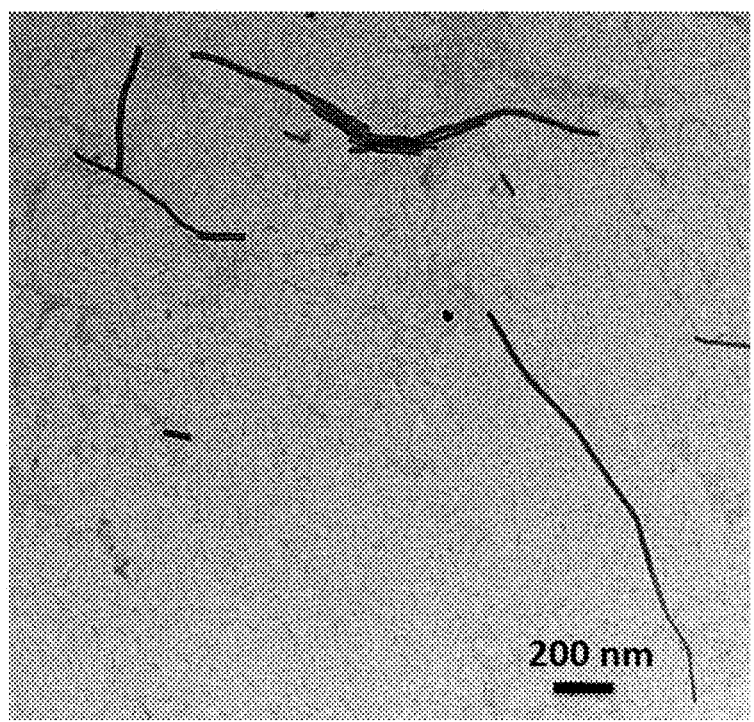

FIG. 34 shows the TEM image of supramolecular polymers of organic molecule 1, prepared from organic molecule 1 (0.18 mM)+PEG$_{45}$-b-PAA$_{69}$ ([carboxylic acid]=1 mM) in aqueous solution. (Entry no. 18 in Table 1: Organic Molecule 1 is shown in Formula 12).

Figure 35:
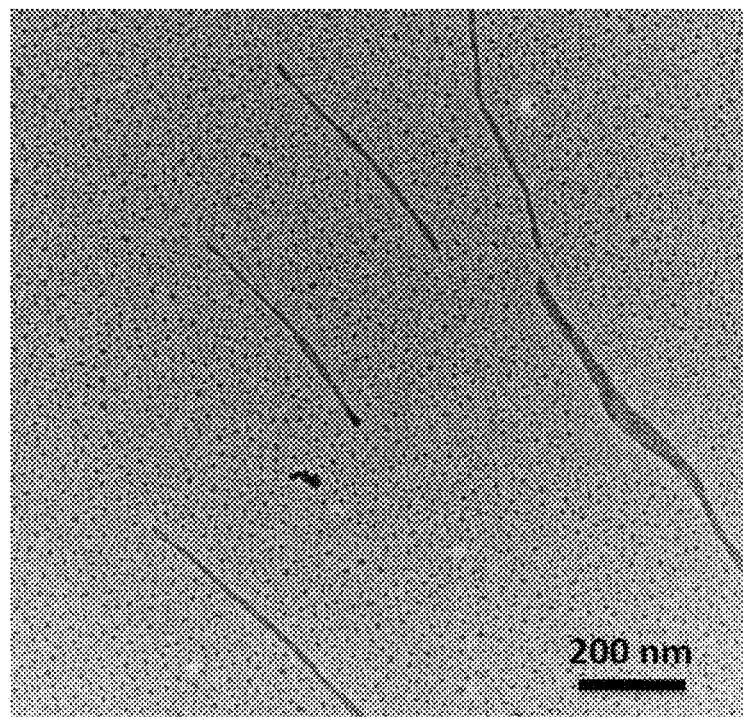

FIG. 35 shows the TEM image of supramolecular polymers of organic molecule 2, prepared from organic molecule 2 (0.28 mM)+PEG$_{45}$-b-PAA$_{69}$ ([carboxylic acid]=1 mM) in aqueous solution. (Entry no. 19 in Table 1: Organic Molecule 2 is shown in Formula 13).

DETAILED DESCRIPTION OF THE INVENTION

The disclosed method and compositions may be understood more readily by reference to the following detailed description of particular embodiments and the Example included therein and to the Figures and their previous and following description.

I. Definitions

The term "living polymerization" or "living characteristic feature" herein refers to the ends of the propagating polymers being active (during polymerization) and the ends of the formed polymers remaining active (after polymerization). The term "living supramolecular polymerization" refers to supramolecular polymerization in which the ends of the propagating supramolecular polymers being active (during polymerization) and the ends of the formed supramolecular polymers remaining active (after polymerization). One form of living supramolecular polymerization is polymerization of solvophobic small-molecule components having a planar or linear geometry based on non-covalent interactions and interaction of the small-molecule components with a solvophilic polymer component. Such living supramolecular polymerization can result in, for example, the formation of nanostructures and/or microstructures, which can be, for example, a core-shell nanofiber.

The term "solvophobic" herein refers to a substance or component that is not soluble or have poor solubility in a specific solvent. The term "solvophilic" herein refers to a substance or component that is soluble in a specific solvent. When the solvent is water or an aqueous medium, the terms solvophobic and solvophilic correspond to "hydrophobic" and "hydrophilic," respectively.

The term "small-molecule component" herein refers to small molecules generally of a molecular weight less than 3,000 Da. In the case of components used to form the disclosed supramolecular polymers, small-molecule components are generally planar or linear in configuration and can associate or interact with one another non-covalently. Such non-covalent associations and interactions of such small-molecule components can be, for example, π-π interactions, hydrogen bonding interactions, metal-metal interactions, solvophobic-solvophobic interactions (such as hydrophobic-hydrophobic interactions) between two or more of the small-molecule components. In some forms, the "small-molecule components" can be, for example, metal complexes coordinated with ligands in a coplanar arrangement or organic small molecules generally having one or more non-saturated aryl groups. The metal complexes can involve one, two, three or more metal centers.

The term "polymer component" herein refers to polymers formed by covalent bonding of a plurality of repeating units. In the case of components used to form the disclosed supramolecular polymers, the polymer component can interact with the small-molecule components in forming the supramolecular polymers.

The terms "ligand" and "metal coordination ligand" herein refer to ions or molecules that can bind to transition-metal ions to form complexes. The number of ligands bound to the transition metal ion is called the coordination number. Any ion or molecule with a pair of nonbonding electrons can be a ligand. Many ligands are described as monodentate (e.g., "one-toothed") because they "bite" the metal in only one place. Monodentate ligands refer to ligands that have only one donor atom attached to the metal center. Bidentate ligands refer to ligands that have two donor atoms attached to the same metal center. Tridentate ligands refer to ligands that have three donor atoms attached to the same metal center. Tetradentate ligands refer to ligands that have four donor atoms attached to the same metal center. The term "chelate" means "claw" from its Greek stem and is used to describe ligands that can grab the metal in two or more places.

The term "supramolecular polymer" herein refers to assemblies whose building blocks are held together by non-covalent interactions. Examples of building blocks include molecules, macromolecules, metal complexes, ions, nanoparticles or a combination of them. Non-limiting examples of supramolecular polymers include coiled chains connected by non-covalent interactions, nanofibers of peptide amphiphiles, worm-like micelles of block copolymers, assemblies of block copolymers, or one-dimensional nanoparticulate assemblies.

The term "assembly" herein refers to the formation of ordered structures from conjugates or complexes (e.g., the planar $d^8$ or $d^{10}$ metal complexes) through non-covalent supramolecular interactions. Non-limiting examples of non-covalent supramolecular interactions include hydrophobic-hydrophobic interactions, π-π interactions, hydrogen bonding, metal . . . metal interactions, C—H . . . O interactions and C—H . . . X (where X is F or Cl) interactions, etc.

The phrase "nanostructures" refers to ordered structures of any possible geometry with at least one of the dimensions in the range of 1-1000 nm. Non-limiting examples of the geometry of ordered structures include spherical, cylindrical, rod-like, disk-like, wheel-like, tube-like, leaf-like, cube-like, and fibrous structure. For example, the terms "nanofibers," "nanowires," "nanorods", "nano-ribbons," and "nano-belts" refer to ordered structures with a length substantially greater than a width, and the width is in the range of 1-1000 nm.

The term "alkyl group" as used herein is a branched or unbranched saturated hydrocarbon group of 1 to 30 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like.

The term "alkoxy" as used herein is an alkyl group bound through a single, terminal ether linkage; that is, an "alkoxy" group can be defined as —OR where R is alkyl as defined above.

The term "alkenyl group" as used herein is a hydrocarbon group of from 2 to 30 carbon atoms and structural formula containing at least one carbon-carbon double bond.

The term "alkynyl group" as used herein is a hydrocarbon group of 2 to 30 carbon atoms and a structural formula containing at least one carbon-carbon triple bond.

The terms "amino" and "amine" refer to both substituted and unsubstituted amines.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aryloxy" as used herein is an aryl group bound through a single, terminal ether linkage; that is, an "aryloxy" group can be defined as —OR where R is aryl as defined above.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "arylalkyl" as used herein is an aryl group having an alkyl, alkynyl, or alkenyl group as defined above attached to the aromatic or heteroaromatic group.

The term "alkoxyalkyl group" is defined as an alkyl, alkenyl, alkynyl, aryl, arylalkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, arylalkyl, cycloalkyl, halogenated alkyl, or heterocycloalkyl group described above.

The term "carboxylic acid" as used herein is represented by the formula —C(O)OH; the term "carboxylate" as used herein is represented by —C(O)O⁻.

The term "aldehyde" as used herein is represented by the formula —C(O)H.

The term "keto group" as used herein is represented by the formula —C(O)R, where R is an alkyl, alkenyl, alkynyl, aryl, arylalkyl, cycloalkyl, halogenated alkyl, heteroalkyl or heterocycloalkyl group described above.

The term "carbonyl group" as used herein is represented by the formula C=O.

The term "ether" as used herein is represented by the formula AOA¹, where A and A¹ can be, independently, an alkyl, halogenated alkyl, heteroalkyl, alkenyl, alkynyl, aryl, heteroaryl, cycloalkyl, cycloalkenyl, heterocycloalkyl, or heterocycloalkenyl group described above.

The term "silyl group" as used herein is represented by the formula —SiRR'R", where R, R', and R" can be, independently, hydrogen, an alkyl, alkenyl, alkynyl, aryl, arylalkyl, cycloalkyl, halogenated alkyl, alkoxy, or heterocycloalkyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, arylalkyl, cycloalkyl, halogenated alkyl, or heterocycloalkyl group described above.

The terms "substituent" and "substitute" as used herein refers to all permissible substituents of the compounds or functional groups described herein. The term "substituted" refers to a compound that has one group (usually a hydrogen or carbon) substituted with a substituent. The term "substituted with" in connection with a compound, structure, R group, etc., refers to substituents of the referenced compound, structure, R group, etc. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, arylalkyl, substituted arylalkyl, alkoxy, substituted alkoxy, phenoxy, substituted phenoxy, aryloxy, substituted aryloxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, arylalkyl, substituted arylalkyl, alkoxy, substituted alkoxy, phenoxy, substituted phenoxy, aryloxy, substituted aryloxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, poly(lactic-co-glycolic acid), peptide, and polypeptide groups can be further substituted.

The term unsubstituted "$C_x$" in reference to a compound, substituent, moiety, etc., refers to a compound, substituent, moiety, etc., having x carbon atoms.

The term unsubstituted "$C_y$-$C_x$" in reference to a compound, substituent, moiety, etc., refers to a compound, substituent, moiety, etc., having from y to x carbon atoms, inclusive. For example, $C_1$-$C_8$ alkyl is an alkyl having from 1 to 8 carbon atoms, inclusive.

II. Compositions

Disclosed are compositions and methods relating to supramolecular polymers, their formation, and their use. The disclosed supramolecular polymers have active ends for propagation or elongation. In some forms, the supramolecular polymers include a plurality of small-molecule components and a polymer component. In general, the small-molecule components have a planar or linear geometry, are solvophobic, and, in the supramolecular polymer, are associated with one another non-covalently based on, but not limited to, metal-metal interactions, π-π interactions, hydrogen-bonding interactions, solvophobic-solvophobic interactions, or a combination thereof. In general, the polymer component is solvophilic and, in the supramolecular polymer, is in a non-covalent interaction with some or all of the small-molecule components.

Generally, the supramolecular polymers have active ends, where the active ends are capable of being elongated by addition of additional small-molecule components. Generally, the additional small-molecule components have a planar or linear geometry, are solvophobic, and can be associated with one another (and with the small-molecule components already in the supramolecular polymer) non-covalently based on metal-metal interactions, π-π interactions, hydrogen-bonding interactions, solvophobic-solvophobic interactions, or a combination thereof. The additional small-molecule components can be the same, different, or a combination, as the small-molecule components already in the supramolecular polymer.

In some forms, the supramolecular polymer has a nanostructure, where the nanostructure is in the form of, for example, nanofibers, nanorods, nano-belts, nano-ribbons, or nano-wires.

In some forms, the supramolecular polymer can have a core-shell structure, where the shell comprises at least a portion of the polymer component and the core comprises the first small-molecule components.

Also disclosed are methods of forming supramolecular polymers. In some forms, the method includes incubating, in a solvent, small-molecule components and a polymer component for a period of time effective to induce formation of supramolecular polymers.

Generally, the small-molecule components used in the methods have a planar or linear geometry, are solvophobic, and can associate with one another non-covalently based on metal-metal interactions, π-π interactions, hydrogen-bonding interactions, solvophobic-solvophobic interactions, or a combination thereof.

Generally, the polymer component used in the methods is solvophilic, and can interact with some or all of the small-molecule components non-covalently to stabilize the supramolecular polymers formed.

Generally, the supramolecular polymers formed by the methods have active ends capable of propagation or elongation upon addition of additional small-molecule components.

In some forms, the supramolecular polymers formed by the methods have one or more nanostructures, wherein the nanostructure is in the form of nanofibers, nanorods, nano-belts, nano-ribbons, or nano-wires. In some forms, the supramolecular polymers formed have a core-shell structure, where the shell comprises at least a portion of the polymer component and the core comprises the small-molecule components.

In some forms, the method can further involve propagating or elongating the supramolecular polymer formed by incubating additional small-molecule components with the formed supramolecular polymers. Generally, the additional small-molecule components have a planar or linear geometry and associate non-covalently with one another, with the small-molecule components of the formed supramolecular polymer, or both. Generally, the polymer component interacts with the additional small-molecule components.

In some forms, the additional small-molecule components are identical to the small-molecule components of the formed supramolecular polymers. In some forms, the additional small-molecule components are different from the small-molecule components of the formed supramolecular polymers.

In some forms, the solvent is water.

In some forms, the method can further involve fabricating aligned metal nanoparticles or nanowires using the formed supramolecular polymer as a precursor.

The supramolecular polymerization process generally involves at least two components, a small-molecule component with planar or linear geometry that is solvophobic and a polymer component that is solvophilic. In one embodiment in an aqueous medium, the planar or linear small molecule is hydrophobic and the polymer component is hydrophilic and soluble in water. Non-limiting non-covalent interactions such as metal-metal interactions, π-π interactions, hydrogen-bonding interactions, solvophobic-solvophobic (or hydrophobic-hydrophobic) interactions, or a combination of different interactions between the planar or linear small molecules direct the growth of supramolecular polymers, and the polymer component interacts with the planar or linear small molecules non-covalently and stabilizes the supramolecular polymers formed. After supramolecular polymerization, the ends of the supramolecular polymers remain active and allow the addition of more planar or linear small-molecule monomer or a different planar or linear small-molecule monomer to produce a longer supramolecular homopolymer or a supramolecular block copolymer. Supramolecular polymers and/or supramolecular block copolymers can have various compositions, controlled dimensions, and different architectures. The supramolecular polymers obtained exhibit rich spectroscopic and luminescence properties and other functional properties. Furthermore, the supramolecular polymers in the solution state exhibit "self-healing" properties.

The two-component living supramolecular polymerization is realized by cooperative self-assembly of the small-molecule components and the polymer components. The small-molecule components which are solvophobic and exhibit strong tendency to associate with each other through non-limiting non-covalent interactions such as metal-metal interactions, π-π interactions, hydrogen-bonding interactions, solvophobic-solvophobic (or hydrophobic-hydrophobic) interactions, or a combination of different interactions, and the polymer components which are solvophilic and can interact with the small-molecule components non-covalently, are used. For example, mixing a solution of hydrophobic small molecules in a water-miscible organic solvent (such as acetonitrile, acetone, methanol, THF or DMSO) with aqueous solution of hydrophilic polymers leads to the aggregation of the hydrophobic small molecules. The formed aggregates can be stabilized by the hydrophilic polymers into nanoaggregates in aqueous solution. Supramolecular polymerization then occurs which is driven by non-covalent interactions, such as but not limited to metal-metal interactions, π-π interactions, hydrogen-bonding interactions, hydrophobic-hydrophobic interactions, or a combination of different interactions between the hydrophobic small molecules.

Without the presence of hydrophilic (solvophilic) polymers, the hydrophobic (solvophobic) small molecules in solution at low concentration cannot undergo spontaneous supramolecular polymerization. In some cases, the hydrophobic (solvophobic) small molecules in solution form amorphous aggregates or form precipitates. In the presence of hydrophilic (solvophilic) polymers, the polymers can interact with the hydrophobic (solvophobic) small molecules and stabilize the nanoaggregates formed by the small molecules. Within the nanoaggregates, the interaction between polymers and the small molecules are non-covalent, that means the small molecules are not restricted to the polymer chains and thus have high mobility. Therefore, when the nanoaggregates are incubated at room temperature, the small molecules can be sufficiently dynamic to interact with each other due to their strong tendency to form non-limiting non-covalent interactions such as metal-metal interactions, π-π interactions, hydrogen-bonding interactions, hydrophobic-hydrophobic (solvophobic-solvophobic) interactions, or a combination of different interactions. Thus the supramolecular polymerization occurs. The non-covalent interactions direct the growth of supramolecular polymers. The supramolecular polymerization follows a nucleation-elongation mechanism. During supramolecular polymerization, the ends of the supramolecular polymers are active. Addition of the small molecules onto the propagating supramolecular polymer chains leads to length increases of the supramolecular polymers. The supramolecular polymerization exhibits living characters.

The processing utilizes a two-component system to perform living supramolecular polymerization rather than a single-component system as the existing methods in the literature do. The existing methods based on single-component systems are largely dependent on the design and synthesis of some specialized molecules or macromolecules. It is believed that this is the reason why the types of supramolecular monomers in the field of living supramolecular polymerization are quite limited. The processing herein uses polymer-small molecule pairs to perform living supramolecular polymerization. The small molecules and the polymers can be designed and synthesized independently. This novel strategy endows the processing with large flexibility as the requirements for the supramolecular monomers are very general. The two-component living supramolecular polymerization involves: 1) the supramolecular monomers exhibiting strong tendency to associate with each other via intermolecular interactions; 2) the supramolecular monomers interacting with the polymers non-covalently. Based on this novel strategy, this disclosure largely broadens the scope of supramolecular monomers in the field of living supramolecular polymerization. Furthermore, because the small molecules and the polymers can be designed and synthesized independently, the present invention requires less synthetic efforts and thus reduces the cost for the preparation and simplifies the process. Specifically, in the embodiments, the major driving force for the living supramolecular polymerization is the non-covalent interactions such as, but not limited to, metal-metal interactions, π-π interactions, hydrogen-bonding interactions, solvophobic-solvophobic (or hydrophobic-hydrophobic) interactions, or a combination of different interactions between the small molecules. It is known that many metal complexes of square-planar, trigonal-planar and linear configurations as well as planar organic molecules show strong tendency to associate with each other through non-covalent metal-metal interactions, π-π interactions, hydrogen-bonding interactions, solvophobic-solvophobic (or hydrophobic-hydrophobic) interactions, or a combination of different interactions.

Therefore, the process allows the living supramolecular polymerization of a variety of planar or linear small molecules.

1. Solvophobic Small Molecules with Planar or Linear Geometry

The small-molecule components that exhibit strong tendency to associate with each other through non-limiting non-covalent interactions such as metal-metal interactions, π-π interactions, hydrogen-bonding interactions, solvophobic-solvophobic (or hydrophobic-hydrophobic) interactions, or a combination of different interactions can be used for living supramolecular polymerization. In some embodiments, the small-molecule components include molecules that are symmetrical or unsymmetrical and have a planar configuration.

Metal Complexes

In some forms, the small-molecule components suitable for living supramolecular polymerization include metal complexes of a square-planar configuration with monodentate, bidentate, tridentate or tetradentate ligands, represented by the following general formula,

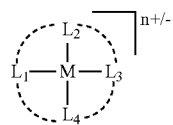

wherein:
(a) M is Ni(II), Pd(II), Pt(II), Rh(I), Ir(I), Au(III), Zn(II) or Cu(II);
(b) $L_1$, $L_2$, $L_3$ and $L_4$ represent ligands with donor atoms independently selected from N, C, O, S, Se, P and As;
(c) the dashed lines represent that the covalent linkages between neighboring ligands may exist or may not exist;
(d) n+/− represents the number of positive charges or negative charges carried by the metal complexes, and n is selected from 0, 1, 2, 3, 4, 5 and 6.

Suitable small-molecule components also include $d^{10}$ metal complexes of a trigonal-planar configuration with monodentate, bidentate or tridentate ligands, represented by the following general formula,

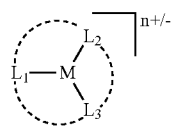

wherein:
(a) M is Cu(I), Ag(I), Au(I), Ni(0), Pd(0), Pt(0), Zn(II), Cd(II) or Hg(II);
(b) $L_1$, $L_2$, and $L_3$ represent ligands with donor atoms independently selected from N, C, O, S, Se, P and As;
(c) the dashed lines represent that the covalent linkages between neighboring ligands may exist or may not exist;
(d) n+/− represents the number of positive charges or negative charges carried by the metal complexes, and n is selected from 0, 1, 2, 3, 4, 5 and 6.

Additional small-molecule components suitable for living supramolecular polymerization include $d^{10}$ metal complexes of a linear configuration, represented by the following general formula,

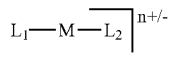

wherein:
(a) M is Cu(I), Ag(I), Au(I), Ni(0), Pd(0), Pt(0), Zn(II), Cd(II) or Hg(II);
(b) $L_1$ and $L_2$ represent ligands with donor atoms independently selected from N, C, O, S, Se, P and As;
(c) n+/− represents the number of positive charges or negative charges carried by the metal complexes, and n is selected from 0, 1, 2, 3, 4, 5 and 6.

In some forms, suitable metal complexes of a planar configuration are an alkynylplatinum(II) terpyridine complex defined by formula 1:

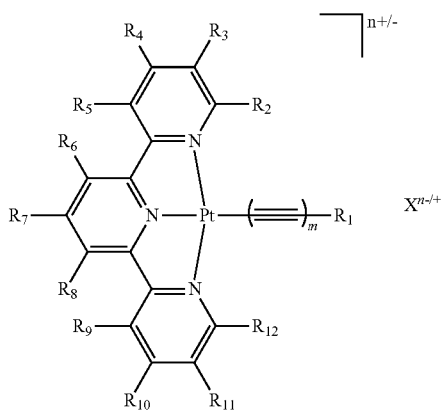

Formula 1. An exemplary alkynylplatinum(II) terpyridine complex.

In formula 1, $R_1$ is H or substituted or unsubstituted $C_1$-$C_{30}$ alkyl, $C_2$-$C_{30}$ alkenyl, $C_3$-$C_{30}$ aryl (e.g., phenyl, tolyl, xylyl, and naphthyl), $C_3$-$C_{30}$ heteroaryl, $C_1$-$C_{30}$ alkoxy, $C_3$-$C_{30}$ phenoxy, $C_3$-$C_{30}$ aryloxy, $C_3$-$C_{30}$ arylthio, $C_1$-$C_{30}$ alkylthio, $C_2$-$C_{30}$ carbonyl, $C_1$-$C_{30}$ carboxyl, amino, amido, polyaryl, which may contain heteroatoms; m is an integer between 1 and 20, e.g., m=1, 2, 3, 4, 5; $R_2$, $R_3$, $R_4$, $R_5$, $R_6$, $R_7$, $R_8$, $R_9$, $R_{10}$, $R_{11}$ and $R_{12}$ are, independently, H, $C_1$-$C_{30}$ alkyl, $C_2$-$C_{30}$ alkenyl, $C_2$-$C_{30}$ alkynyl, $C_3$-$C_{30}$ aryl or N-substituted amide, e.g., the substitution being $C_1$-$C_{30}$ alkyl, which may contain heteroatoms; n+/− represents the number of positive charges or negative charges carried by the metal complexes, and n is selected from 0, 1, 2, 3, 4, 5 and 6; $X^{n-}$ is an anion, such as but not limited to a chloride ($Cl^-$), nitrate ($NO_3^-$), triflate ($OTf^-$=trifluoromethanesulfonate), hexafluorophosphate ($PF_6^-$), perchlorate ($ClO_4^-$), tetrafluoroborate ($BF_4$), and tetraphenylboronate ($BPh_4$); and $X^{n+}$ is a cation, such as but not limited to a $Na^+$, $K^+$, $Ca^{2+}$, $Mg^{2+}$, bis(triphenylphosphine)iminium ($PPN^+$), quaternary ammonium cations, pyridinium cations and phosphonium cations.

In some forms, the one or more pyridyl portions of formula 1 can be substituted with other heterocycles.

In some forms, suitable platinum(II) complexes for supramolecular living polymerization have a structure of formula 1 where $R_1$ is phenyl, m is 1, and $R_2$-$R_{12}$ are H, as shown by formula 2, i.e., [Pt(tpy)(C≡C—Ph)]X, denoted as Complex 1.

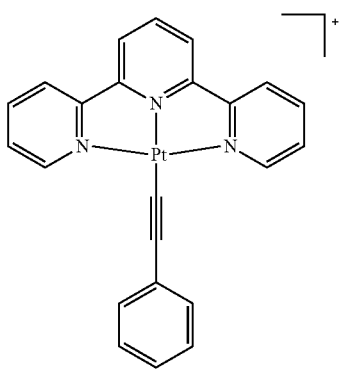

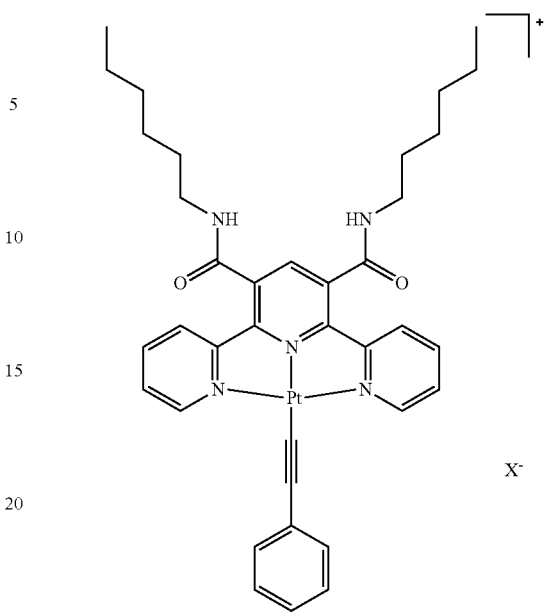

Formula 2. Chemical structure of Complex 1, [Pt(tpy)(C≡C—Ph)]X. tpy=2,2':6',2''-terpyridine; Ph=phenyl; $X^-$ is an anion, which is selected from but not limited to a chloride ($Cl^-$), nitrate ($NO_3^-$), triflate ($OTf^-$=trifluoromethanesulfonate), hexafluorophosphate ($PF_6^-$), perchlorate ($ClO_4^-$), tetrafluoroborate ($BF_4^-$), and tetraphenylboronate ($BPh_4^-$).

In some forms, suitable platinum(II) complexes for supramolecular living polymerization have a structure of formula 1 where $R_1$ is H, m is 2, $R_2$-$R_{12}$ are H as shown by formula 3, i.e., [Pt(tpy)(C≡C—C≡CH)]X, denoted as Complex 2.

Formula 4. Chemical structure of Complex 3.

In some forms, suitable metal complexes of a planar configuration are a platinum(II) 2,6-bis(benzimidazol-2'-yl) pyridine complex defined by formula 5:

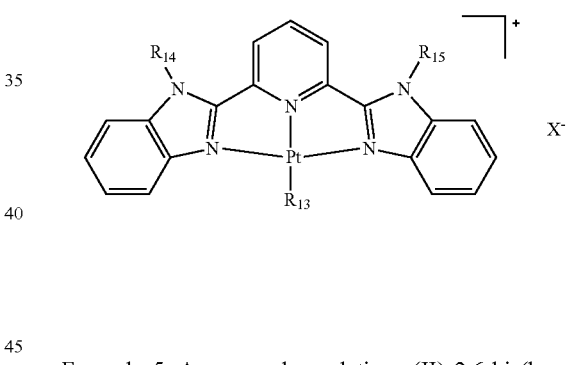

Formula 5. An exemplary platinum(II) 2,6-bis(benzimidazol-2'-yl)pyridine complex.

In formula 5, $R_{13}$ is selected from but not limited to Cl and C≡C—R', where R' is H or substituted or unsubstituted $C_1$-$C_{30}$ alkyl, $C_2$-$C_{30}$ alkenyl, $C_3$-$C_{30}$ aryl (e.g., phenyl, tolyl, xylyl, and naphthyl), $C_3$-$C_{30}$ heteroaryl, $C_1$-$C_{30}$ alkoxy, $C_3$-$C_{30}$ phenoxy, $C_3$-$C_{30}$ aryloxy, $C_3$-$C_{30}$ arylthio, $C_1$-$C_{30}$ alkylthio, $C_2$-$C_{30}$ carbonyl, $C_1$-$C_{30}$ carboxyl, amino, amido, polyaryl; $R_{14}$ and $R_{15}$ are independently H or substituted or unsubstituted $C_1$-$C_{30}$ alkyl, $C_2$-$C_{30}$ alkenyl, $C_2$-$C_{30}$ alkynyl, $C_3$-$C_{30}$ aryl (e.g., phenyl, tolyl, xylyl, and naphthyl), $C_3$-$C_{30}$ heteroaryl, $C_1$-$C_{30}$ alkoxy, $C_3$-$C_{30}$ phenoxy, $C_3$-$C_{30}$ aryloxy, $C_3$-$C_{30}$ arylthio, $C_1$-$C_{30}$ alkylthio, $C_2$-$C_{30}$ carbonyl, $C_1$-$C_{30}$ carboxyl, amino, amido, or polyaryl; and $X^-$ is an anion, which is selected from but not limited to $Cl^-$, $NO_3^-$, $OTf^-$, $PF_6^-$, $ClO_4^-$, $BF_4^-$, and $BPh_4^-$.

In some forms, suitable platinum(II) 2,6-bis(benzimidazol-2'-yl)pyridine complexes for supramolecular living polymerization have a structure of formula 5 where $R_{13}$ is Cl; $R_{14}$ and $R_{15}$ are $C_{12}$ alkyl; and $X^-$ is $PF_6^-$; as shown by formula 6, which is denoted as Complex 4.

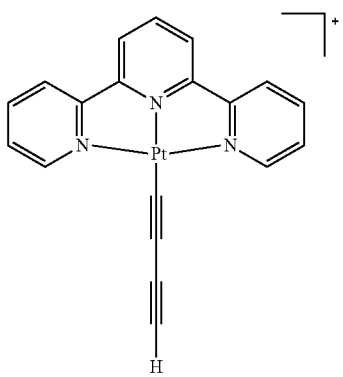

Formula 3. Chemical structure of Complex 2, [Pt(tpy)(C≡C—C≡CH)]X. $X^-$ is an anion, which is selected from but not limited to $Cl^-$, $NO_3^-$, $OTf^-$, $PF_6^-$, $ClO_4^-$, $BF_4^-$, and $BPh_4^-$.

In some forms, suitable platinum (II) complexes for supramolecular living polymerization have a structure of formula 1 where $R_1$ is phenyl; m is 1; $R_6$ and $R_8$ are N-hexylamide; $R_2$-$R_5$, $R_7$, and $R_9$-$R_{12}$ are H; and $X^-$ is an anion, which is selected from but not limited to $Cl^-$, $NO_3^-$, $OTf^-$, $PF_6^-$, $ClO_4^-$, $BF_4^-$, and $BPh_4^-$; as shown by formula 4, which is denoted as Complex 3.

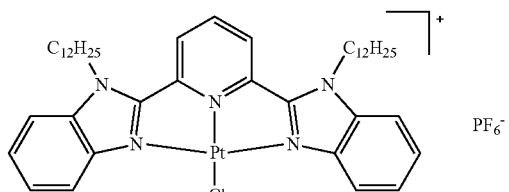

Formula 6. Chemical structure of Complex 4.

In some forms, suitable platinum(II) 2,6-bis(benzimidazol-2'-yl)pyridine complexes for supramolecular living polymerization have a structure of formula 5 where $R_{13}$ is Cl; $R_{14}$ and $R_{15}$ are $C_5$ alkyl; and $X^-$ is $PF_6^-$; as shown by formula 6, which is denoted as Complex 5.

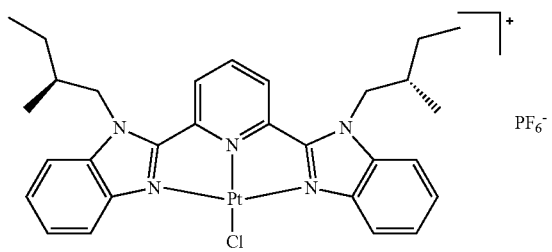

Formula 7. Chemical structure of Complex 5.

In some forms, suitable platinum(II) 2,6-bis(benzimidazol-2'-yl)pyridine complexes for supramolecular living polymerization have a structure of formula 5 where $R_{13}$ is Cl; $R_{14}$ and $R_{15}$ are $C_{10}$ alkenyl; and $X^-$ is $PF_6^-$; as shown by formula 8, which is denoted as Complex 6.

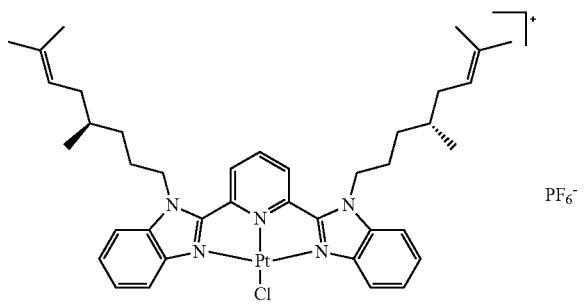

Formula 8. Chemical structure of Complex 6.

In some forms, suitable metal complexes of a planar configuration are planar configurations of nickel(II) complexes, palladium(II) complexes, and rhodium(I) complexes. For example, an exemplary nickel(II) complex is shown by formula 9, denoted as Complex 7; an exemplary palladium(II) complex shown by formula 10, denoted as Complex 8; and an exemplary rhodium(I) complex shown by formula 11, denoted as Complex 9.

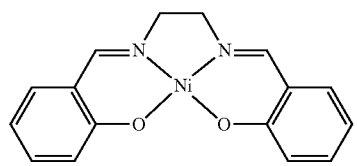

Formula 9. Chemical structure of Complex 7.

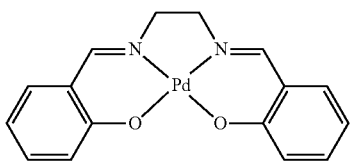

Formula 10. Chemical structure of Complex 8.

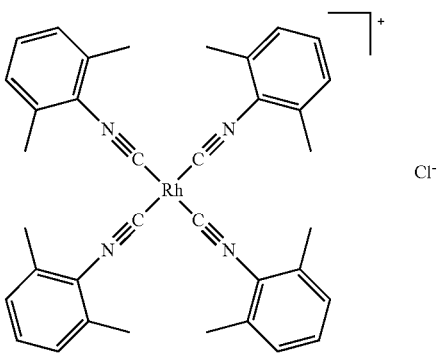

Formula 11. Chemical structure of Complex 9.

Organic Molecules

In addition, suitable small-molecule component for supramolecular living polymerization includes planar organic molecules that are positively charged, negatively charged or charge-neutral. Suitable planar molecules can have one or more aryls, heteroaryls or polyaryls in a planar configuration, one or more atoms (including heteroatoms) supporting hydrogen bonding, or a combination of both.

An exemplary planar organic molecule for supramolecular living polymerization is shown by formula 12, denoted as Organic Molecule 1; and an exemplary planar organic molecule for supramolecular living polymerization is shown by formula 13, denoted as Organic Molecule 2.

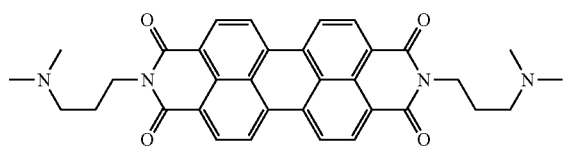

Formula 12. Chemical structure of Organic Molecule 1.

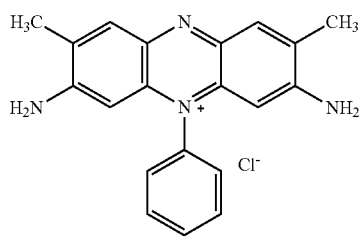 [SMILES: Cc1cc2nc3cc(C)c(N)cc3[n+](-c3ccccc3)c2cc1N ; [Cl-]]

Formula 13. Chemical structure of Organic Molecule 2.

2. Solvophilic Polymers

A polymer component, which can interact with the small-molecule components non-covalently and stabilize the supramolecular polymers formed, is used in the living supramolecular polymerization. Generally, a solvophilic polymer is used for assisting and stabilizing the supramolecular polymerization involving planar small molecules. In some embodiment, the polymer contains one or more segments or blocks that can be deprotonated or protonated to become ions and interact at least electrostatically with the planar small molecules. In some embodiments, supramolecular polymers assembled from the disclosed small-molecule components and the polymer component form a core-shell structure. In such structures, for example, a charged portion of the polymer component interacts and resides with the small-molecule components as the core and a neutral and solvophilic portion of the polymer component is presented as a shell. In an aqueous medium, for example, the neutral and solvophilic portion of the polymer can be, for example, one or more polyalkylene oxide portions (e.g., polyethylene glycol (PEG)), one or more polypropylene glycol portions, or both. In some embodiments, the polyalkylene oxide portion of the polymer has a weight average molecular weight of from about 1 kDa to about 21 kDa (e.g., from about 1 kDa to about 3 kDa, e.g., about 2 kDa, or from about 2 kDa to about 5 kDa, e.g., about 3.5 kDa, or from about 4 kDa to about 6 kDa, e.g., about 5 kDa). In some embodiments, the average weight percentage of the polyalkylene oxide portion of the polymer is from about 20% to about 90%, or from about 30% to about 80%, or from about 40% to about 60%.

Examples of suitable polymer components include diblock copolymers, triblock copolymers and multi-block copolymers, wherein at least one of the blocks is solvophilic or hydrophilic and at least one of the blocks can bind the small-molecule component through non-covalent interactions comprising electrostatic attractions, hydrogen-bonding interactions, solvophobic-solvophobic (or hydrophobic-hydrophobic) interactions and π-π interactions, and wherein each of the blocks are independently selected from, but are not limited to, one or more of poly(acrylic acid), poly(acrylate), poly(methacrylic acid), poly(methacrylate), poly(acrylamide), poly(methacrylamide), poly(oxide), polyphosphite, polyphosphonate, polyphosphate, polyphosphoramidate, poly(carbonate), poly(ester), poly(anhydride), poly(urethane), poly(diene), poly(acetylene), poly(alkene), poly(vinyl ether), poly(vinyl alcohol), poly(vinyl ketone), poly(vinyl halide), poly(vinyl nitrite), poly(vinyl ester), poly(styrene), poly(vinyl pyridine), quaternized poly(vinyl pyridine), polyethylenimine, poly(lysine), polyphosphonium, polysulfonium, poly(amide), poly(amino acid), poly(lactic acid), poly(saccharide), DNA, RNA, poly(aromatic sulfonate), quaternized poly(arylamine), polyvinylpyrrolidone, poly(ethylene glycol), poly(alkylaminoacrylate), and their derivatives.

Exemplary polymer components further include amphiphilic polymeric surfactants selected from, but not limited to, one or more of poly(acrylic acid), poly(acrylate), poly(methacrylic acid), poly(methacrylate), poly(acrylamide), poly(methacrylamide), poly(oxide), polyphosphite, polyphosphonate, polyphosphate, polyphosphoramidate, poly(carbonate), poly(ester), poly(anhydride), poly(urethane), poly(diene), poly(acetylene), poly(alkene), poly(vinyl ether), poly(vinyl alcohol), poly(vinyl ketone), poly(vinyl halide), poly(vinyl nitrite), poly(vinyl ester), poly(styrene), poly(vinyl pyridine), quaternized poly(vinyl pyridine), polyethylenimine, poly(lysine), polyphosphonium, polysulfonium, poly(amide), poly(amino acid), poly(lactic acid), poly(saccharide), DNA, RNA, poly(aromatic sulfonate), quaternized poly(arylamine), polyvinylpyrrolidone, poly(ethylene glycol), poly(alkylaminoacrylate), their copolymers and their solvophobically (or hydrophobically) modified derivatives.

3. Medium (e.g., Solvents and pH)

A suitable solvent for supramolecular living polymerization disclosed herein is one where the planar and/or small molecules do not dissolve or have poor solubility; while the polymers that can interact with the planar small molecule may be solubilized therein. The solvent permits the one or more non-covalent interactions, e.g. but not limited to, metal-metal interactions, π-π interactions, hydrogen-bonding interactions, and solvophobic-solvophobic (or hydrophobic-hydrophobic) interactions, for the assembly of planar small molecules. Solvent is selected such that the small-molecule component with planar or linear geometry is solvophobic and exhibits a strong interaction to permit supramolecular polymerization of the small-molecule component in the presence of the solvophilic polymer component.

The solvent can be adjusted for different pH such that one or more portions or blocks of the polymer may be deprotonated or protonated, dependent on the pKa of polymer, to become available for at least electrostatic interactions with the planar small molecules. Suitable pH can be about pH 1, 2, 3, 4, 5, 6, 7, 8, 9, 10, 11, 12, 13.

An exemplary suitable medium is an aqueous solution of a defined pH to support non-covalent interactions between the polymer and the planar small molecules, e.g., electrostatic interactions.

4. Configurations and Properties of Formed Supramolecular Polymers

The disclosed supramolecular polymers generally form but not limited to nanofibers, nanorods, worm-like structures, and/or twisted ribbon structures, where the width can be several or a few hundred nanometers and the length can be tens of nanometers to 1 micron or even several tens or hundreds of microns (and subject to grow as a characteristic feature of living supramolecular polymerization). The two-component supramolecular polymers formed can exhibit a core-shell structure; the nanosized core of the small molecules is packed in a highly ordered manner, and the shell consists of polymers. The supramolecular polymers can exhibit one-dimensional morphologies such as but not limited to nanowires, nanofibers, nanorods and nanobelts. The rigidity of the supramolecular polymers is affected by the internal attractions within the supramolecular polymers. The morphologies can also be influenced by the steric repulsion between the polymer shell chains. Large steric repulsion results in morphologies with a high curvature (such as nanofibers), whereas small steric repulsion leads to morphologies with a low curvature (such as nanobelts). The lengths of the supramolecular polymers can be controlled by the feed ratio of the small molecules to the polymers; large feed ratio leads to long supramolecular polymers. The diameters of the supramolecular polymers can be controlled by the structural parameters of the polymers, and can also be affected by the strength of the non-covalent interactions between the polymers and the small molecules.

After supramolecular polymerization, the ends of the two-component supramolecular polymers formed remain active. Further addition of small molecules into the supramolecular polymers leads to length increase of the supramolecular polymers. When the added small molecules differ from the small molecules in the supramolecular polymers formed, supramolecular block copolymers with segmented architectures can be produced. These behaviors are characteristic features of living supramolecular polymerization. Each step of the formation of the block of the supramolecular block copolymers is based on coassembly of the small molecules and the polymers. Unlike existing techniques of living supramolecular polymerizations where each step for block formation is based on self-assembly of only one component, i.e., supramolecular monomer, the disclosed living supramolecular polymerization is based on at least two distinct components of different chemical structures.

The two-component supramolecular polymers in the solution state exhibit "self-healing" properties. The two-component supramolecular polymers in aqueous solution can be broken into small pieces by mechanical shearing and forces, physical destruction or sonication, and after removal of the mechanical shearing and forces, physical destruction or sonication, incubation of the small pieces for a certain period of time can lead to recovered formation of the two-component supramolecular polymers. Self-healing therefore refers to the ability that, after being broken, the system of the two-component supramolecular polymers can reorganize back into its original state or a state close to its original state, without external intervention.

III. Process to Prepare Supramolecular Polymers

One or more small-molecule components supporting non-covalent assembly and one or more polymer components are mixed and incubated in a suitable medium, generally solvophobic for the small-molecule components and solvophilic for the polymer component, for a period of time (e.g. but not limited to, about 1 hour, a few hours, 1 day, 2 days, or longer) for assembly and supramolecular polymerization to take place. In some embodiments, the molar ratio of the small molecules to the polymer is from about 0.005:1 to about 50:1 (e.g., about 0.01:1 to about 1:1). In some embodiments, the molar ratio of the small molecules to the polymer can be greater than 1:1, as long as the concentration and molecular weight of the polymer is effective to support the assembly of monomeric small molecules.

Further supramolecular polymerization can be initiated by addition of the same or different small molecules to the solution containing supramolecular polymers, where the polymer component has excess capacity to support the assembly of monomeric small molecules.

Nanostructures of supramolecular polymers with various morphologies can be obtained by tuning the chemical compositions of the small-molecule component and the polymer component (e.g., concentrations, relative concentrations, chemical compositions and structural parameters), solvent compositions of the systems, and the extent of metal-metal, $\pi$-$\pi$ interactions, hydrogen bonding, and other non-covalent interactions between the building blocks.

IV. Use of Supramolecular Polymers

The disclosed functional supramolecular polymers can have various compositions, controlled dimensions, and different architectures. The two-component supramolecular polymers can be soluble in those solvents where small-molecule components are solvophobic and polymer components are solvophilic. They can be water-soluble, nanosized with controlled diameters and lengths, and some with near-infrared emission properties. These luminescent nanomaterials can find application in bioimaging, medical imaging, chemical and biological sensing. Compared to the monomeric platinum(II) complexes, the supramolecular polymers have more absorption in the visible region and show much stronger emission in the near-infrared region. Luminescence and excited-state properties can be associated with dinuclear $d^8$-$d^8$ metal complexes, as well as $d^{10}$-$d^{10}$ metal complexes (Zipp A P, Coord. Chem. Rev, 84, 47 (1988); Roundhill D M, et al., Acc. Chem. Res., 22, 55 (1989); Casper J V, J. Am. Chem. Soc., 107, 6718 (1985)). Short metal-metal distances are generally found to be associated with these complexes.

Some of the two-component supramolecular polymers formed have charge transport properties, which can be used to fabricate organic semiconductors, organic conductors or organic field-effect transistors. These two-component supramolecular polymers can also serve as precursors for aligned metal nanoparticles or nanowires.

This disclosure allows supramolecular polymerization of various small-molecule components such as metal complexes. Some metal complexes can be used as bioprobes, chemosensors, diagnostics, bioimaging and biolabeling agents, and therapeutic drugs. The supramolecular polymerization of these metal complexes of therapeutic properties can be considered as a drug-loading or drug-encapsulation process. The two-component supramolecular polymers of these metal complexes of therapeutic properties can exhibit excellent release properties and can find application in the field of therapeutic drugs.

It is to be understood that the disclosed method and compositions are not limited to specific synthetic methods, specific analytical techniques, or to particular reagents unless otherwise specified, and, as such, may vary. It is also to be understood that the terminology used herein is for the purpose of describing particular embodiments only and is not intended to be limiting.

EXAMPLES

Materials and Methods

Complexes 1, 2 and 3 were synthesized as described in Yam V W W and coworkers, Organometallics 2001, 20, 4476; Yam V W W, et al., J. Am. Chem. Soc. 2002, 124, 6506; and Yeung M C L, et al., ChemistryOpen 2014, 3, 172. Complexes 4, 5 and 6 were synthesized as described in Po C, et al., J. Am. Chem. Soc. 2011, 133, 12136. Complexes 7 and 8 were synthesized as described in Blake A B, et al., Inorg. Chem. 1995, 34, 1125 and Miller K J, et al., Inorg. Chem. 1999, 38, 4510. Complex 9 was synthesized as described in Chen Y, et al., Angew. Chem. Int. Ed. 2010, 49, 9968. Organic molecule 1 was synthesized as described in Wang B, et al., Angew. Chem. Int. Ed. 2010, 49, 1485. Organic molecule 2 was purchased from Sigma-Aldrich.

Poly(ethylene glycol)-b-poly(tert-butyl acrylate) (PEG-b-PtBA) diblock copolymer was synthesized via atom transfer radical polymerization (Davis K A, et al., Macromolecules 2000, 33, 4039). The macro-initiator PEG-Br was synthesized as described in Jankova K, et al., Macromolecules 1998, 31, 538-541. For the polymerization of tBA, a degassed mixture of PEG-Br, CuBr, and toluene and a degassed mixture of PMDETA and tBA were mixed (degassed via nitrogen bubbling). The molar ratio of PEG-Br:CuBr:PMDETA was 1:0.5:0.5, and the degree of polymerization of PtBA was controlled by the feed ratio of tBA:PEG-Br. The polymerization was conducted at 100° C. in an oil bath and finally quenched in an ice bath. The copper complex in the reaction mixture was removed by passing the reaction mixture through $Al_2O_3$ column using dichloromethane as an eluent.

To prepare poly(ethylene glycol)-b-poly(acrylic acid) (PEG-b-PAA), PEG-b-PtBA was first dissolved in dichloromethane, and then trifluoroacetic acid was added into the solution to selectively hydrolyze the tent-butyl ester groups.

After hydrolysis for two days, the reaction mixture was evaporated under reduced pressure to dryness. The obtained PEG-b-PAA was purified by four cycles of dissolution in methanol/precipitation in hexane.

UV-Vis absorption spectra were recorded on a Cary 50 (Varian) spectrophotometer with a Xenon flash lamp. Steady-state emission spectra were recorded using a Spex Fluorolog-3 Model FL3-211 fluorescence spectrofluorometer equipped with a R2658P PMT detector. Circular dichroism (CD) measurements were recorded with a Jasco (Tokyo, Japan) J-815 CD spectropolarimeter. Quartz cuvettes with 10-mm path length were used for UV-Vis, emission and circular dichroism measurements unless otherwise indicated. Transmission electron microscopy (TEM) experiments were performed on Philips CM100 with an accelerating voltage of 100 kV. TEM images were captured by Philips CM100 unless otherwise indicated. Energy dispersive X-ray analysis (EDX) and selected area electron diffraction (SAED) experiments were carried out on FEI Tecnai G2 20 Scanning TEM.

Results

The following compositions of supramolecular polymers were prepared. The results in Table 1 serve to illustrate one of the many examples of the living supramolecular polymerization disclosed in the present invention and should not be taken as a limiting case of the reagents and conditions used or the dimensions and morphologies observed.

TABLE 1

Exemplary agents and concentrations to prepare supramolecular polymeric nanofibers.

| Entry no. | Small molecule | Polymer component | Medium | Fiber dimensions |
|---|---|---|---|---|
| 1 | Complex 1 0.15 mM | $PEG_{45}$-b-$PAA_{69}$ 1 mM carboxylic acid | Aqueous pH 5 incubated for 1 day | average diameter 10 nm, length several micrometers |
| 2 | Complex 1 complex:carboxylic acid (molar) = 0.015:1 | $PEG_{45}$-b-$PAA_{69}$ | | average length 340 nm |
| 3 | Complex 1 complex:carboxylic acid (molar) = 0.06:1 | $PEG_{45}$-b-$PAA_{69}$ | | average diameter 10 nm, length 520 nm |
| 4 | Complex 1 complex:carboxylic acid (molar) = 0.12:1 | $PEG_{45}$-b-$PAA_{69}$ | | average diameter 10 nm, length several micrometers |
| 5 | complex 1 0.15 mM | $PEG_{45}$-b-$PAA_{30}$ 1 mM carboxylic acid | Aqueous pH 5 1 day | average diameter 5 nm, length several micrometers |
| 6 | complex 1 0.15 mM | $PEG_{45}$-b-$PAA_{45}$ 1 mM carboxylic acid | | average diameter 7 nm, length several micrometers |
| 7 | complex 2 0.25 mM | $PEG_{45}$-b-$PAA_{69}$ 1.1 mM carboxylic acid | Aqueous pH 5 Incubated for 1 day | worm-like morphology: average diameter 14 nm, average length 560 nm |
| 8 | complex 3 0.11 mM | $PEG_{45}$-b-$PAA_{69}$ 1 mM carboxylic acid | Aqueous pH 5 1 day RT | rod-like morphology: average diameter 43 nm, average length 600 nm |
| 9 | complex 4 0.098 mM | $PEG_{45}$-b-$PAA_{69}$ 1 mM carboxylic acid | Aqueous pH 5 1 day RT | rod-like morphology: average diameter 23 nm, average length 260 nm |
| 10 | complex 5 0.12 mM | $PEG_{45}$-b-$PAA_{69}$ 1 mM carboxylic acid | Aqueous pH 5 1 day RT | twisted-ribbon morphology: average diameter ~15 nm, average length ~1 μm |
| 11 | complex 6 0.11 mM | $PEG_{45}$-b-$PAA_{69}$ 1 mM carboxylic acid | Aqueous pH 5 1 day RT | twisted-ribbon morphology: average diameter ~15 nm, average length ~500 nm |
| 12 | complex 7 0.24 mM | $PEG_{45}$-b-$PAA_{69}$ 1 mM carboxylic acid | Aqueous pH 5 1 day RT | belt-like morphology: average width 110 nm, length several micrometers |
| 13 | complex 8 0.24 mM | $PEG_{45}$-b-$PAA_{69}$ 1.8 mM carboxylic acid | Aqueous pH 5 1 day RT | crystalline morphology of sizes in micrometers |
| 14 | complex 9 1.5 mM | $PEG_{45}$-b-$PAA_{69}$ 10 mM carboxylic acid | Aqueous pH 5 1 day RT | average diameter ~60 nm, length several micrometers |
| 15 | Nanofibers of entry no. 3 as seeds, further addition of complex 1 at final complex:carboxylic acid (molar) = 0.12:1 | | Aqueous pH 5 1 day RT | increase length, unchanged diameter 520 nm |
| 16 | Nanorods of entry no. 8 as seeds, further addition of complex 1 at final complex 1:complex 3:carboxylic acid (molar) = 0.18:0.11:1 | | Aqueous pH 5 1 day RT | complex 1 grew at the ends of the nanorods into nanobelts |

TABLE 1-continued

Exemplary agents and concentrations to prepare supramolecular polymeric nanofibers.

| Entry no. | Small molecule | Polymer component | Medium | Fiber dimensions |
|---|---|---|---|---|
| 17 | Complex 1 0.15 mM | $PEG_{113}$-b-$PAA_{51}$ 1 mM carboxylic acid | 1. Aqueous 2 days; 2. Sonicate in aqueous for 1 hour; 3. Incubate for 5 days. | 1. average diameter 14 nm, average length 530 nm; 2. broke into smaller pieces with a diameter of 14 nm and a length of 240 nm; 3. diameter remained unchanged at 14 nm, and a length of 720 nm were formed. |
| 18 | Organic Molecule 1 0.18 mM | $PEG_{45}$-b-$PAA_{69}$ 1 mM carboxylic acid | Aqueous pH 6.1 1 day RT | nanofibers with an average diameter of 21 nm, average length ~700 nm. |
| 19 | Organic Molecule 2 0.28 mM | $PEG_{45}$-b-$PAA_{69}$ 1 mM carboxylic acid | Aqueous pH 5 1 day RT | nanofibers with an average diameter of 23 nm, average length ~1 µm. |

Example 1. Supramolecular Polymerization of the Two-Component System Involving Complex 1 and $PEG_{45}$-b-$PAA_{69}$ (Entry No. 1 in Table 1)

Supramolecular polymerization of complex 1 and $PEG_{45}$-b-$PAA_{69}$ (the subscript represents the degree of polymerization of each block) was performed by mixing them in aqueous solution and then incubating the mixture for 1 day. The concentrations of small-molecule complex 1 and carboxylic acid in the mixture were 0.15 mM and 1 mM, respectively. The pH value of the mixture was 5, where the carboxylic acid groups were partially deprotonated. PEG-b-PAA interacted with complex 1 via electrostatic attraction.

Figure 10:
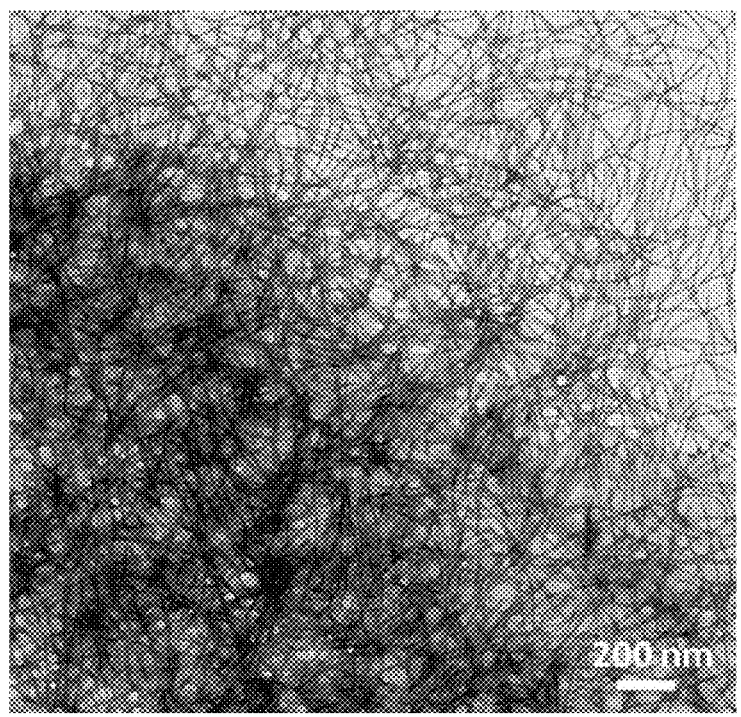
FIG. 10 shows the transmission electron microscopic (TEM) image of supramolecular polymers of complex 1, prepared from complex 1 (0.15 mM)+PEG$_{45}$-b-PAA$_{69}$ ([carboxylic acid]=1 mM) in aqueous solution (Entry no. 1 in Table 1: Complex 1 is shown in Formula 2 and the anion, X$^-$, is triflate, OTf$^-$).

The two-component supramolecular polymers obtained are nanofibers with an average diameter of 10 nm and a length of several micrometers under TEM observation (FIG. 10). As a control, neither an aqueous solution containing small-molecule component, complex 1, alone, nor an aqueous solution containing polymer component, $PEG_{45}$-b-$PAA_{69}$, alone, can form nanofibers.

Figure 11:
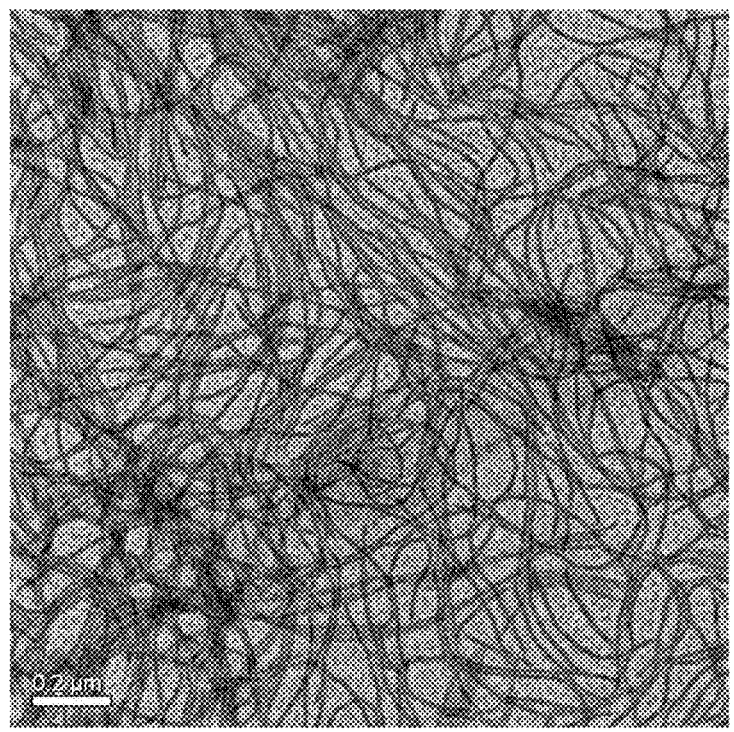
FIGS. 11 and 12 show the TEM image (FIG. 11) and the electron diffraction pattern (FIG. 12) of supramolecular polymers of complex 1, prepared from complex 1 (0.15 mM)+PEG$_{45}$-b-PAA$_{69}$ ([carboxylic acid]=1 mM) in aqueous solution, respectively. These TEM experiments were performed by FEI Tecnai G2 20 Scanning TEM. (Entry no. 1 in Table 1: Complex 1 is shown in Formula 2 and the anion, X$^-$, is triflate, OTf$^-$).
Figure 12:
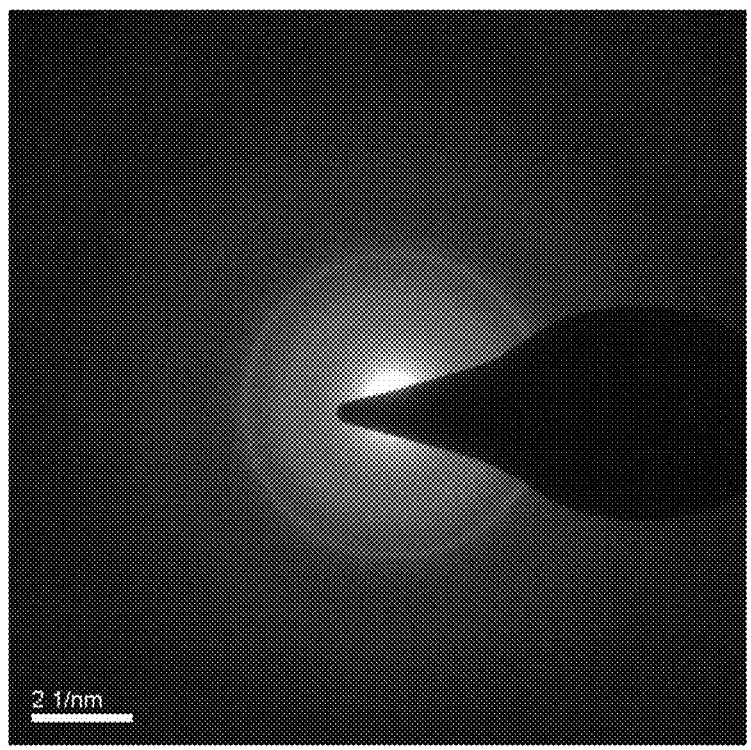

TEM-EDX analysis showed the presence of platinum in the nanofibers. Selected area electron diffraction (SAED) of the nanofibers showed a diffraction ring that corresponded to an ordered packing of platinum atoms in the nanofibers with a d-spacing of 0.34 nm (FIGS. 11 and 12). SAED is sensitive to heavy atoms, and in this example, the heavy atoms were platinum atoms. Therefore, the diffraction ring was believed to be attributed to the periodical arrangement of platinum atoms in the nanofibers. The spacing of 0.34 nm is a characteristic interaction distance for non-covalent Pt-Pt interaction. The axis of the Pt-Pt interaction was perpendicular to the plane of the small-molecule platinum(II) complex, and thus the distance between two neighboring platinum(II) complexes was also 0.34 nm. This results indicated there were π-π interactions between the platinum (II) complex molecules in the nanofibers. Pt-Pt interactions and π-π interactions between the small-molecular platinum (II) complexes, together with the non-covalent interaction with the polymer component, were believed to drive the supramolecular polymerization as well as the formation of nanofibers.

The nanofibers possessed a core-shell structure. The core was of a "brick-and-mortar" structure formed by complex 1 and PAA, where the complexes were packed into ordered structures and the flexible PAA polymer chains interacted with the complexes and stabilized the structures. The shell was formed by the PEG chains, which stabilize the nanofiber in aqueous solution and provide the nanofibers with long-term water-solubility. PEG-coated nanofibers have been demonstrated to exhibit longer circulation time in blood by an order of magnitude than their spherical counterparts (Geng Y, et al., Nat. Nano., 2, 249 (2007)).

Figure 1:
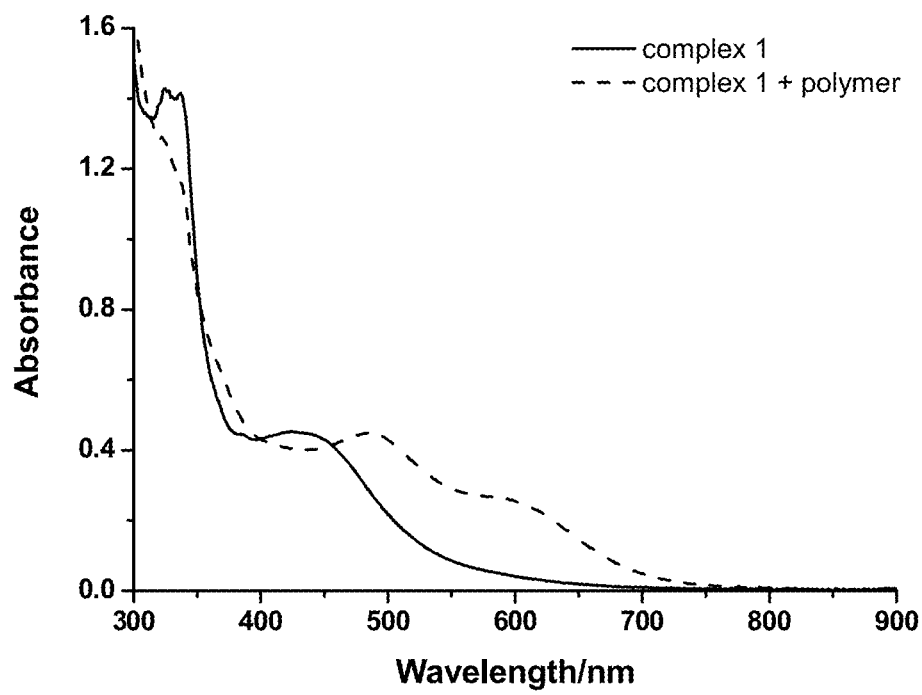
FIGS. 1 and 2 show the UV-vis absorption spectra (FIG. 1) and the steady-state emission spectra (FIG. 2, $\lambda_{ex}$=445 nm) of complex 1 (0.15 mM) in aqueous solution and complex 1 (0.15 mM)+PEG$_{45}$-b-PAA$_{69}$ ([carboxylic acid]=1 mM) in aqueous solution, respectively.
Figure 2:
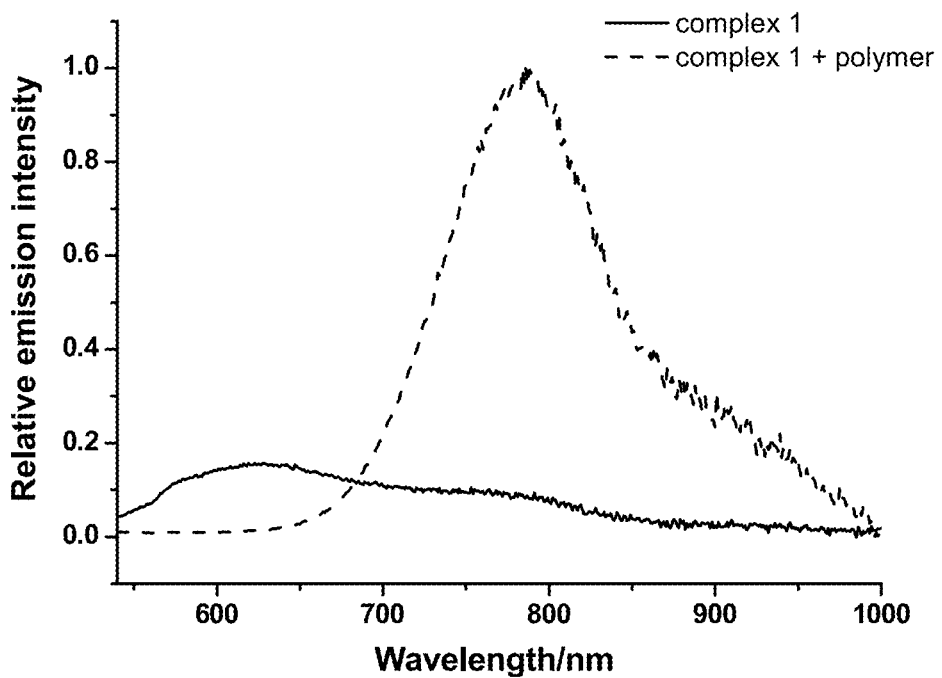

The UV-vis spectrum of complex 1 (without polymers) showed an absorption band at 430 nm and an absorption tail at 500-700 nm (FIG. 1). The absorption tail was due to background aggregation of complex 1 in aqueous solution. In the UV-vis absorption spectrum of the two-component mixture of small-molecule complex 1 and polymers, the intensity of the absorption band decreased at 430 nm and two new lower-energy bands appeared at 490 nm and 605 nm (FIG. 1). The lower-energy absorption bands were originated from metal-metal-to-ligand charge transfer (MMLCT) transitions. The steady-state emission spectra were recorded by excitation at the isosbestic wavelength of 455 nm. Triplet MMLCT emission band of the mixture of small-molecule complex 1 and polymers appeared at 785 nm, and the emission intensity was greatly enhanced when compared to complex 1 in aqueous solution (FIG. 2). These UV-vis and emission results agreed well with TEM results.

Example 2. Time Course of Supramolecular Polymerization of the Two-Component System Involving Complex 1 and $PEG_{45}$-b-$PAA_{69}$ (Entry No. 1 in Table 1)

Figure 13:
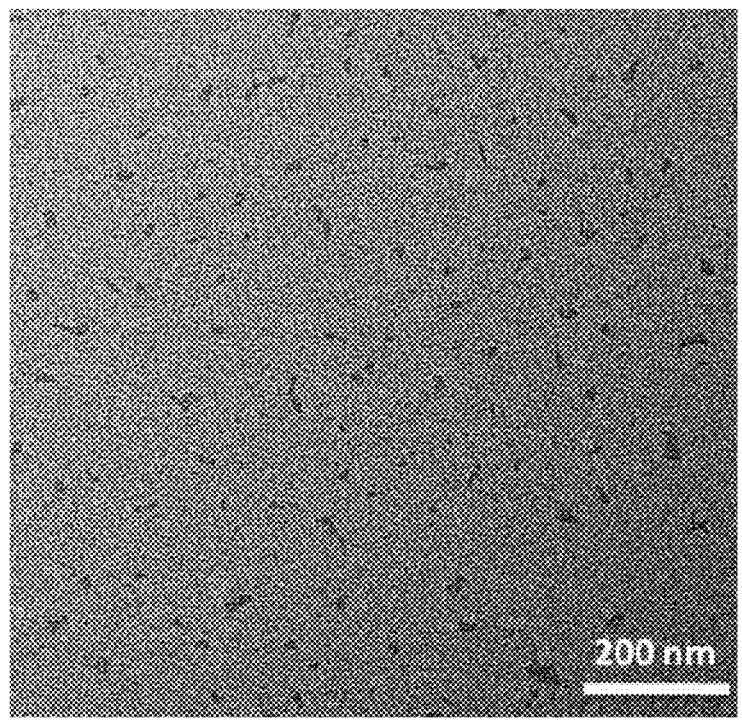
FIGS. 13, 14 and 15 show the TEM images of supramolecular polymers from supramolecular polymerization of complex 1 (0.15 mM) and PEG$_{45}$-b-PAA$_{69}$ ([carboxylic acid]=1 mM) at polymerization time of 1 minute (FIG. 13), 1 hour (FIG. 14) and 12 hours (FIG. 15), respectively. (Entry no. 1 in Table 1: Complex 1 is shown in Formula 2 and the anion, X$^-$, is triflate, OTf$^-$).
Figure 14:
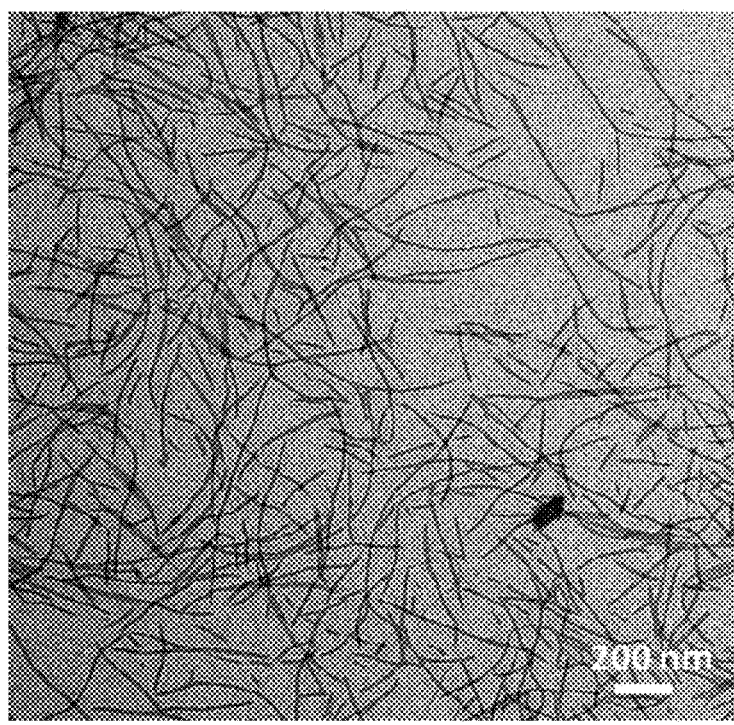
Figure 15:
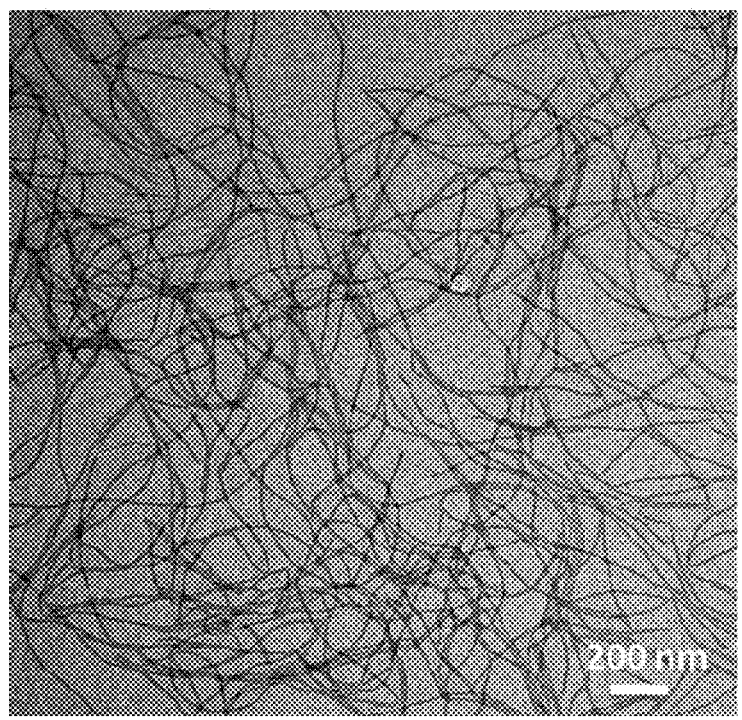

Upon mixing of small-molecule complex 1 and polymer component, $PEG_{45}$-b-$PAA_{69}$, nanoaggregates of the two-component system with sizes of approximately 10 nm were formed, as evidenced by TEM observation (FIG. 13). After standing at room temperature for 1 h, nanofibers with an average diameter of 10 nm and an average length of 440 nm were formed (FIG. 14). After 12 h, the length of nanofibers increased to micrometers (FIG. 15). After 1-day incubation, nanofibers with diameter of 10 nm and length of several micrometers were formed (FIG. 10). The lengths of the nanofibers increased progressively with time, while the diameters of the nanofibers were kept constant. In view of the fact that nanofibers have a crystalline structure formed by ordered packing of the small-molecule platinum(II) complexes, the two-component supramolecular polymerization was likely to have followed a nucleation-elongation mechanism. The nanofibers at the intermediate stages were active and allowed the addition of small-molecule platinum(II) complexes onto both ends of the nanofibers.

Example 3. Length Control of the Two-Component Supramolecular Polymers by Complex/Polymer Feed Ratios (Entry Nos. 1-4 in Table 1)

Figure 16:
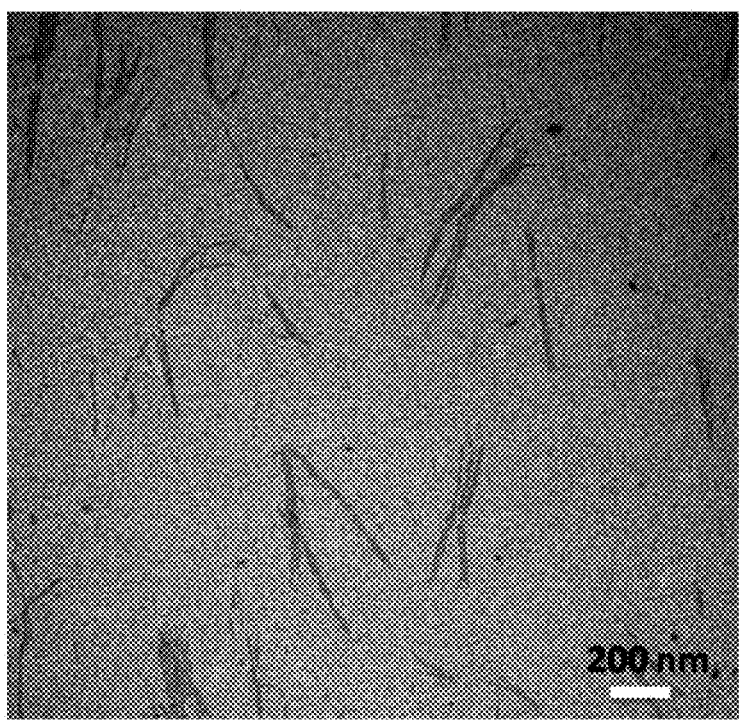
FIGS. 16, 17 and 18 show the TEM images of supramolecular polymers of complex 1, prepared from complex 1
Figure 17:
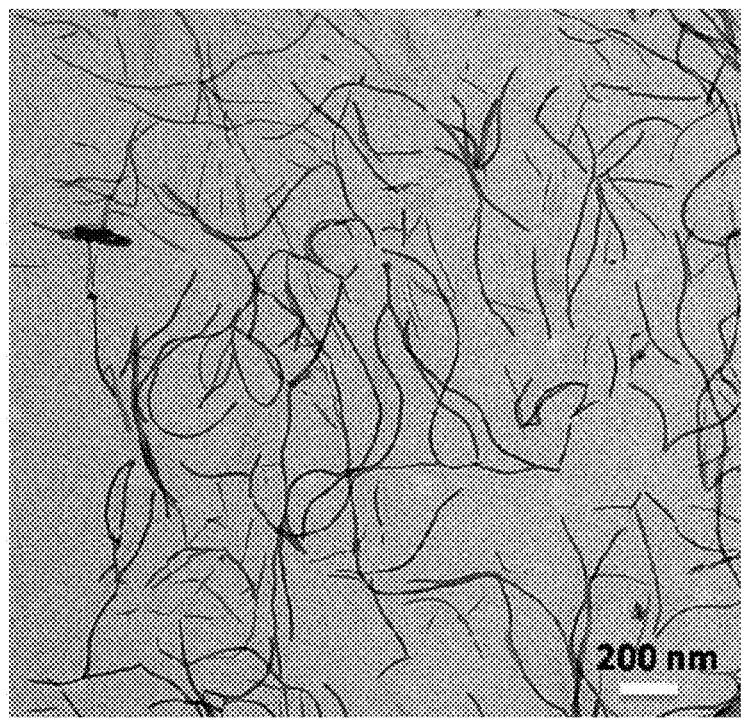
Figure 18:
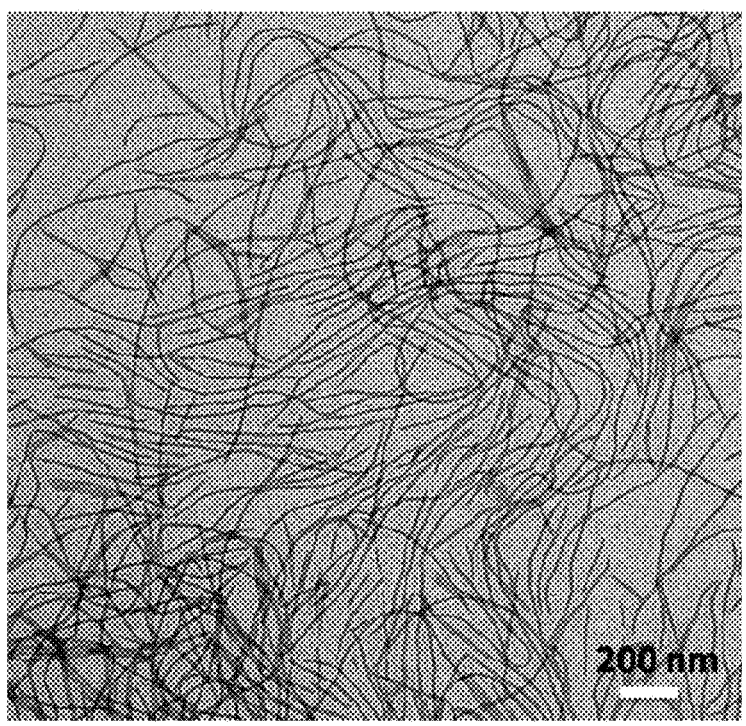

The two-component supramolecular polymers were prepared by mixing small-molecule complex 1 with $PEG_{45}$-b-$PAA_{69}$ in an aqueous solution, and then allowed to undergo incubation for 1 day. The two-component supramolecular polymers formed were observed by TEM. For the mixture with complex/carboxylic acid molar ratio of 0.015/1, the nanofibers formed are not quite regular, with an average length of 340 nm (FIG. 16). For the mixture with complex/carboxylic acid molar ratio of 0.06/1, the nanofibers have a length of 520 nm and diameter of 10 nm (FIG. 17). For the mixture with complex/carboxylic acid molar ratio of 0.12/1, the nanofibers have a length of several micrometers and diameter of 10 nm (FIG. 18). Taking entry nos. 1-4 of Table 1 into consideration, it appeared that increasing the relative amount of the small-molecule complex (or square-planar small molecule) to that of the polymer, while keeping the molar ratio no greater than one, would increase the length of fibers formed from the assembled supramolecular polymers.

Example 4. Diameter Control of the Two-Component Supramolecular Polymers (Entry Nos. 1, 5, and 6 in Table 1)

The two-component supramolecular polymers were prepared by mixing small-molecule complex 1 with PEG-b-PAA in an aqueous solution, and then allowed to undergo incubation for 1 day. The concentrations of complex 1 and carboxylic acid in the mixture were 0.15 mM and 1 mM, respectively. The nanofibers prepared from complex 1+$PEG_{45}$-b-$PAA_{30}$, complex 1+$PEG_{45}$-b-$PAA_{45}$ and complex 1+$PEG_{45}$-b-$PAA_{69}$ had diameters of 5 nm, 7 nm and 10 nm, respectively (FIGS. 19 and 20). The lengths of the nanofibers were several micrometers. It appeared that increasing the number of the charged repeating units in a polymer would increase the diameter (or width) of fibers formed from the assembled supramolecular polymers.

Example 5. Supramolecular Polymerizations of Various Two-Component Systems Involving Small-Molecule Platinum(II) Complexes and $PEG_{45}$-b-$PAA_{69}$ 5.1 Supramolecular Polymerization of the Two-Component System Involving Complex 2 and $PEG_{45}$-b-$PAA_{69}$ (Entry No. 7 in Table 1)

Supramolecular polymerization of small-molecule complex 2 and $PEG_{45}$-b-$PAA_{69}$ was performed by mixing them in an aqueous solution. The concentrations of complex 2 and carboxylic acid in the mixture are 0.25 mM and 1.1 mM, respectively. After incubation for 1 day, two-component supramolecular polymers exhibited a worm-like morphology with a diameter of 14 nm and a length of 560 nm formed (FIG. 21).

Figure 3:
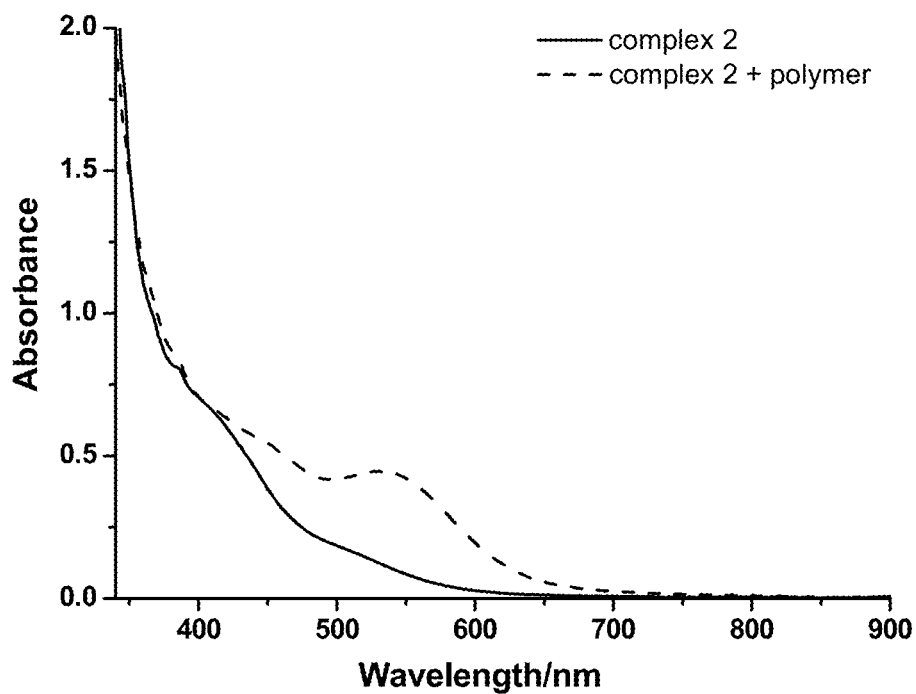
FIGS. 3 and 4 show the UV-vis absorption spectra (FIG. 3) and the steady-state emission spectra (FIG. 4, $\lambda_{ex}$=400 nm) of complex 2 (0.25 mM) in aqueous solution and complex 2 (0.25 mM)+PEG$_{45}$-b-PAA$_{69}$ ([carboxylic acid]=1.1 mM) in aqueous solution, respectively.
Figure 4:
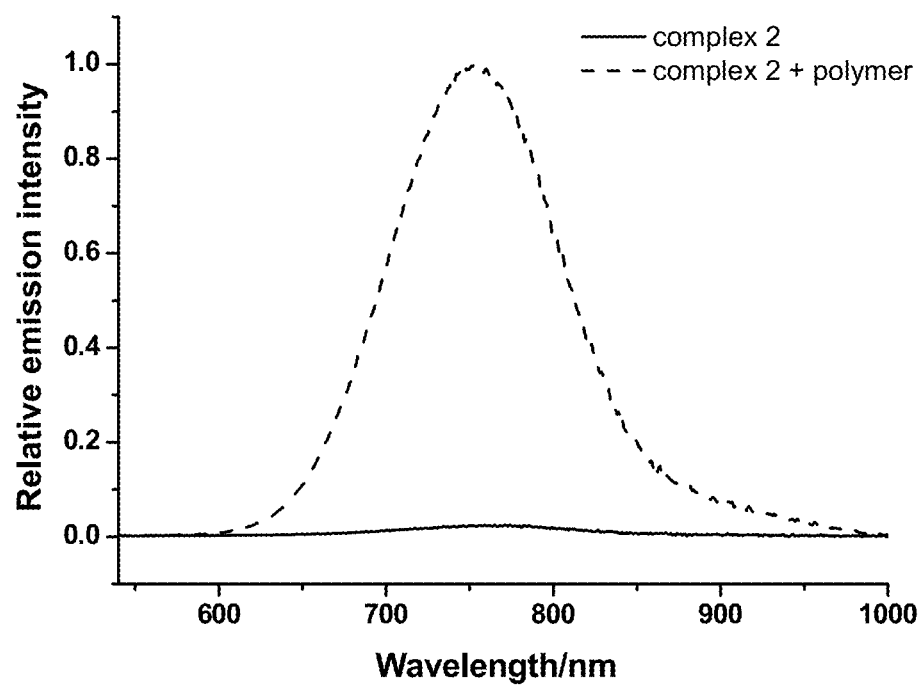

In the UV-vis absorption spectra of the two-component system consisting of small-molecule complex 2 and polymers, a new lower-energy band appeared at 537 nm (FIG. 3). The lower-energy absorption bands were originated from MMLCT transitions. The steady-state emission spectra of the two-component mixtures of complex 2 and polymers were recorded by excitation at the isosbestic wavelength of 400 nm. A new emission band, attributed to a triplet MMLCT emission, appeared at 753 nm, and the emission intensity was greatly enhanced when compared to complex 2 alone in an aqueous solution (FIG. 4).

5.2 Supramolecular Polymerization of the Two-Component System Involving Complex 3 and $PEG_{45}$-b-$PAA_{69}$ (Entry No. 8 in Table 1)

Supramolecular polymerization of small-molecule complex 3 and $PEG_{45}$-b-$PAA_{69}$ was performed by mixing them in an aqueous solution. The concentrations of complex 3 and carboxylic acid in the mixture are 0.11 mM and 1 mM, respectively. After standing at room temperature for 1 day, formed two-component supramolecular polymers were observed by TEM, exhibiting a rod-like morphology with a diameter of 43 nm and a length of 600 nm (FIG. 22). The diameter of the nanorods was much larger than the nanofibers formed by complex 1 and $PEG_{45}$-b-$PAA_{69}$. The lateral hydrogen bonding and hydrophobic interaction between alkyl chains within the nanorods increased the degrees of polymerization in the lateral direction and the rigidity of the formed nanorods.

Figure 5:
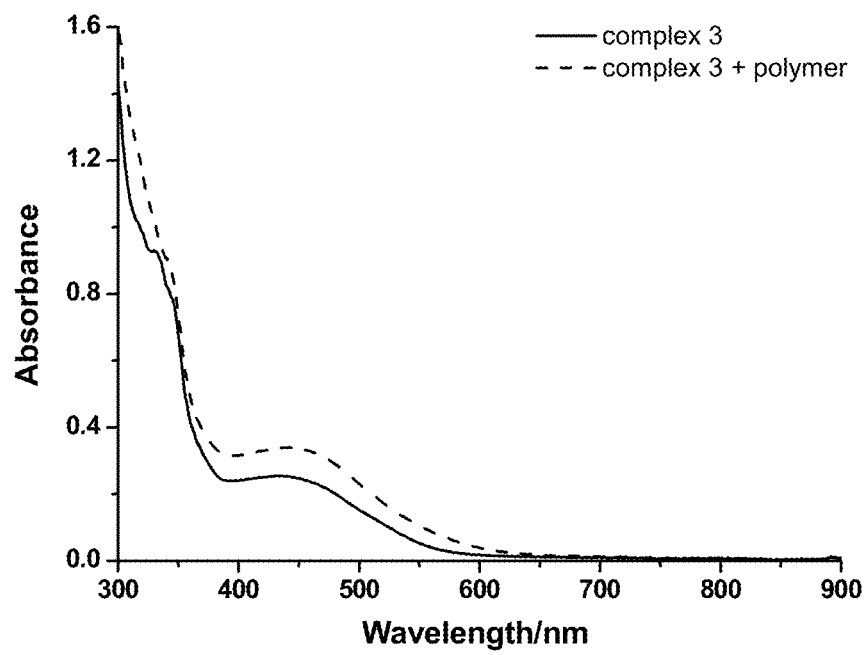
FIGS. 5 and 6 show the UV-vis absorption spectra (FIG. 5) and the steady-state emission spectra (FIG. 6, $\lambda_{ex}$=442 nm) of complex 3 (0.11 mM) in aqueous solution and complex 3 (0.11 mM)+PEG$_{45}$-b-PAA$_{69}$ ([carboxylic acid]=1 mM) in aqueous solution, respectively.
Figure 6:
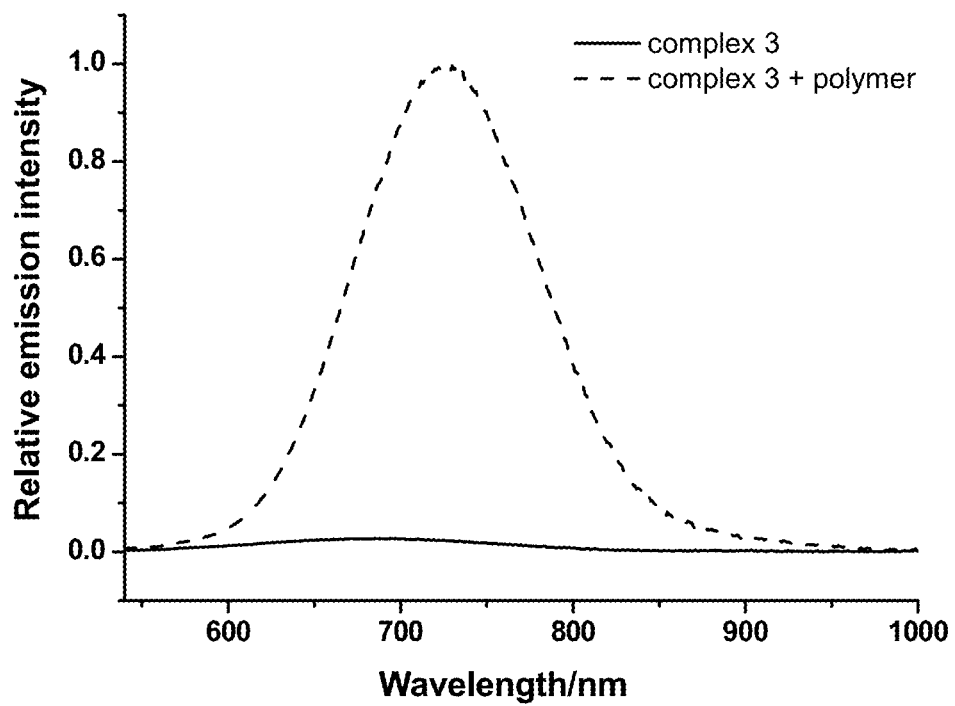

The UV-vis spectrum of complex 3 (without polymers) showed an absorption band at 450 nm and an absorption tail at 500-700 nm. In the UV-vis absorption spectra of the two-component system consisting of small-molecule complex 3 and polymers, the intensity of the absorption band and absorption tail increased, which was attributed to formation of the supramolecular polymers (FIG. 5). The steady-state emission spectra of the two-component mixtures of complex 3 and polymers were recorded by excitation at the wavelength of 442 nm. The triplet MMLCT emission band appeared at 726 nm, and it was found that the emission intensity was greatly enhanced when compared to complex 3 alone in an aqueous solution (FIG. 6).

5.3 Supramolecular Polymerization of the Two-Component System Involving Complex 4 and $PEG_{45}$-b-$PAA_{69}$ (Entry No. 9 in Table 1)

Supramolecular polymerization of small-molecule complex 4 and $PEG_{45}$-b-$PAA_{69}$ was performed by mixing them in an aqueous solution. The concentrations of complex 4 and carboxylic acid in the mixture are 0.098 mM and 1 mM, respectively. After standing at room temperature for 1 day, the two-component supramolecular polymers formed were observed by TEM, exhibiting rod-like morphology with a diameter of 23 nm and a length of 260 nm (FIG. 23).

Example 6. Supramolecular Polymerization of the Two-Component Systems Involving Chiral Platinum(II) Complexes and $PEG_{45}$-b-$PAA_{69}$ 6.1 Supramolecular Polymerization of the Two-Component System Involving Complex 5 and $PEG_{45}$-b-$PAA_{69}$ (Entry No. 10 in Table 1)

Supramolecular polymerization of small-molecule complex 5 and $PEG_{45}$-b-$PAA_{69}$ was performed by mixing them in an aqueous solution. The concentrations of complex 5 and carboxylic acid in the mixture are 0.12 mM and 1 mM, respectively. After standing at room temperature for 1 day, the two-component supramolecular polymers exhibit twisted-ribbon morphology with a diameter of approximately 15 nm and a length of approximately 1 μm (FIG. 24).

Figure 7:
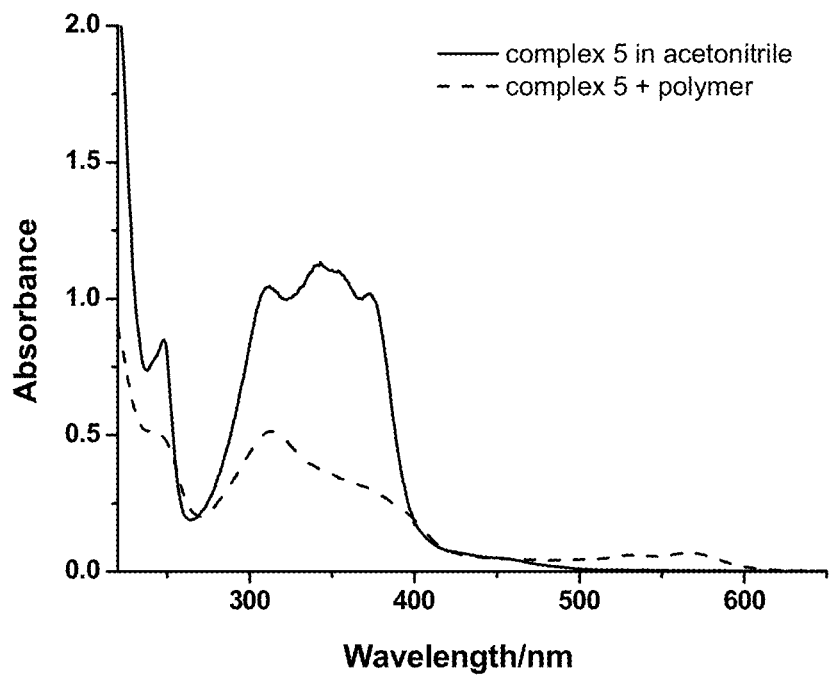
FIGS. 7 and 8 show the UV-vis absorption spectra (FIG. 7) and the circular dichroism spectra (FIG. 8) of complex 5 (0.048 mM) in acetonitrile and complex 5 (0.048 mM)+PEG$_{45}$-b-PAA$_{69}$ ([carboxylic acid]=0.4 mM) in aqueous solution, respectively.
Figure 8:
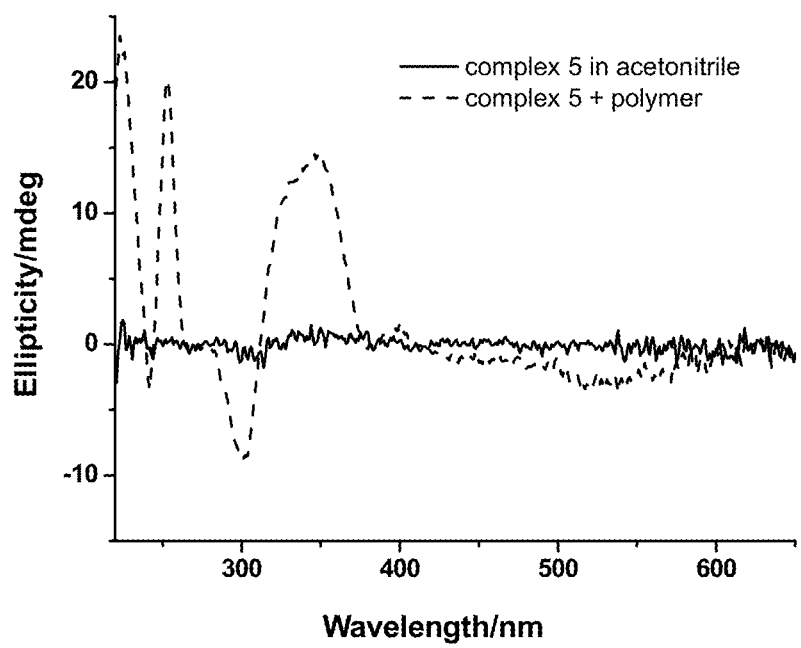

The UV-vis spectrum of complex 5 in the monomeric form showed very intense intraligand absorptions at 270-400 nm and less intense absorption tails at 455 nm (FIG. 7). The low-energy absorption tails are assigned as metal-to-ligand charge transfer (MLCT) transition. In the UV-vis spectra of the two-component mixture of complex 5 and polymers, the intensity of the MLCT absorption band decreased and two new lower-energy bands appeared at 530 and 563 nm (FIG. 7). The lower-energy absorption bands are originated from MMLCT transitions. The CD spectrum of complex 5 in the monomeric form showed little signals, while the two-component mixture of complex 5 and polymers exhibited significant CD signals (FIG. 8). This great enhancement of optical chirality indicated the formation of supramolecular chiral polymers, which agreed with TEM result of the twisted-ribbon morphology.

6.2 Supramolecular Polymerization of the Two-Component System Involving Complex 6 and $PEG_{45}$-b-$PAA_{69}$ (Entry No. 11 in Table 1)

Supramolecular polymerization of small-molecule complex 6 and $PEG_{45}$-b-$PAA_{69}$ was performed by mixing them in an aqueous solution. The concentrations of complex 6 and carboxylic acid in the mixture are 0.11 mM and 1 mM, respectively. After standing at room temperature for 1 day, the formed two-component supramolecular polymers were observed by TEM, exhibiting twisted-ribbon morphology with a diameter of approximately 15 nm and a length of approximately 500 nm (FIG. 25).

Example 7. Supramolecular Polymerization of the Two-Component System Involving Nickel(II) Complex and $PEG_{45}$-b-$PAA_{69}$ (Entry No. 12 in Table 1)

Supramolecular polymerization of small-molecule complex 7 and $PEG_{45}$-b-$PAA_{69}$ was performed by mixing them in an aqueous solution. The concentrations of complex 7 and carboxylic acid in the mixture are 0.24 mM and 1 mM, respectively. After standing at room temperature for 1 day, the two-component supramolecular polymers formed were observed by TEM, exhibiting a belt-like morphology with a width of 110 nm and a length of several micrometers (FIG. 26). Control experiments showed the addition of complex 7 solution into water led to the formation of precipitates that adhered to the wall of the flask or settled down to the bottom of the flask.

Example 8. Supramolecular Polymerization of the Two-Component System Involving Palladium(II) Complex and $PEG_{45}$-b-$PAA_{69}$ (Entry No. 13 in Table 1)

Supramolecular polymerization of small-molecule complex 8 and $PEG_{45}$-b-$PAA_{69}$ was performed by mixing them in an aqueous solution. The concentrations of complex 8 and carboxylic acid in the mixture are 0.24 mM and 1.8 mM, respectively. After standing at room temperature for 1 day, the two-component supramolecular polymers formed exhibited crystalline morphology of sizes in micrometers (FIG. 27). Control experiments showed that addition of complex 8 solution into water led to the formation of precipitates that adhered to the wall of the flask or settled down to the bottom of the flask.

Example 9. Supramolecular Polymerization of the Two-Component System Involving Rhodium(I) Complex and $PEG_{45}$-b-$PAA_{69}$ (Entry No. 14 in Table 1)

Supramolecular polymerization of small-molecule complex 9 and $PEG_{45}$-b-$PAA_{69}$ was performed by mixing them in an aqueous solution. The concentrations of complex 9 and carboxylic acid in the mixture are 1.5 mM and 10 mM, respectively. After incubation for 1 day, two-component supramolecular polymers formed, with a length of several micrometers and a diameter of approximately 60 nm (FIG. 28).

Figure 9:
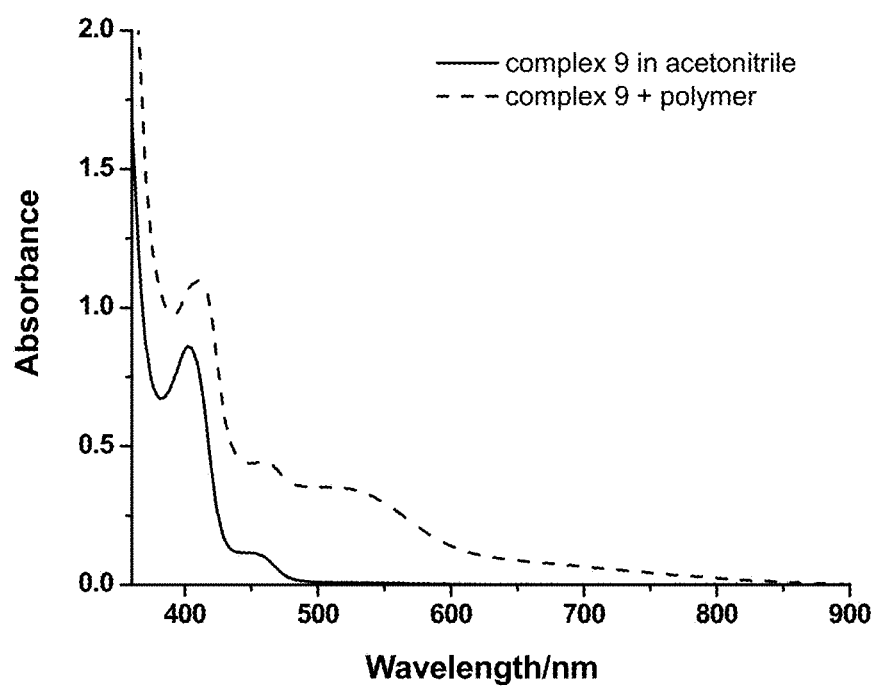
FIG. 9 shows the UV-vis absorption spectra of complex 9 (1.5 mM) in acetonitrile and complex 9 (1.5 mM)+PEG$_{45}$-b-PAA$_{69}$ ([carboxylic acid]=10 mM) in aqueous solution. Quartz cuvette with 1-mm path length was used for UV-vis measurements.

The UV-vis spectrum of complex 9 in the monomeric form showed absorption bands at 402 nm and 455 nm (FIG. 9). The UV-vis spectra of the two-component mixture of complex 9 and polymers showed new lower-energy band appearing at 530 and 700 nm (FIG. 9). The lower-energy absorption bands indicated Rh-Rh interactions within the two-component supramolecular polymers.

Example 10. "Living" Nanofibers of Complex 1 and $PEG_{45}$-b-$PAA_{69}$ as Seeds to Support Further Polymerization with Additional Complex 1 (Entry No. 15 in Table 1)

The nanofibers of complex 1 and $PEG_{45}$-b-$PAA_{69}$ with a length of 520 nm and diameter of 10 nm were used as seeds (FIG. 17). In the nanofiber suspension, $PEG_{45}$-b-$PAA_{69}$ was in excess. Addition of small-molecule complex 1 into the nanofiber suspension and incubation for 1 day led to an increase in the nanofiber length (FIG. 29). The diameter of the nanofibers remained unchanged. The two-component supramolecular polymerization of complex 1 and $PEG_{45}$-b-$PAA_{69}$ occurred at the two ends of the nanofiber seeds.

Example 11. "Living" Nanofibers of Complex 3 and $PEG_{45}$-b-$PAA_{69}$ as Seeds to Support Further Polymerization with Additional Complex 1 (Entry No. 16 in Table 1)

The nanorods of complex 3 and $PEG_{45}$-b-$PAA_{69}$ were used as seeds (FIG. 22). In the nanorod suspension, $PEG_{45}$-b-$PAA_{69}$ was in excess. When small-molecule complex 1 was added into the nanorod suspension, two-component supramolecular polymerization of complex 1 and $PEG_{45}$-b-$PAA_{69}$ took place at the ends of the nanorod seeds. After incubation for 1 day, complex 1 grew at the ends of the nanorods into nanobelts (FIG. 30). In the TEM image, the dark part was the nanorod of complex 3 and $PEG_{45}$-b-$PAA_{69}$, and the grey part was the nanobelt of complex 1 and $PEG_{45}$-b-$PAA_{69}$. The nanobelt was connected to the nanorod to form a heterojunction.

Example 12. "Self-Healing" Properties of the Two-Component Supramolecular Polymers (Entry No. 17 in Table 1)

Supramolecular polymers of small-molecule complex 1 and $PEG_{113}$-b-$PAA_{51}$ were prepared by mixing them and then allowed to undergo incubation for 2 days. The two-component supramolecular polymers formed were nanofibers with a diameter of 14 nm and an average length of 530 nm under TEM observation (FIG. 31). After treatment of the supramolecular polymers in the aqueous solution by sonication for 1 h, the supramolecular polymers broke into smaller pieces with a diameter of 14 nm and a length of 240 nm (FIG. 32). Interestingly, after removal of the sonication and incubation of the pieces for 5 days, two-component supramolecular polymers with diameter remained unchanged and a length of 720 nm were formed (FIG. 33).

The two-component supramolecular polymers exhibited "self-healing" properties in the solution state.

Example 13. Supramolecular Polymerization of the Two-Component Systems Involving Planar Organic Molecules and $PEG_{45}$-b-$PAA_{69}$ 6.1 Supramolecular Polymerization of the Two-Component System Involving Organic Molecule 1 and $PEG_{45}$-b-$PAA_{69}$ (Entry No. 18 in Table 1)

Supramolecular polymerization of Organic Molecule 1 and $PEG_{45}$-b-$PAA_{69}$ was performed by mixing them in an aqueous solution. The concentrations of organic molecule 1 and carboxylic acid in the mixture are 0.18 mM and 1 mM, respectively. The pH value of the mixture was 6.1, where the carboxylic acid groups of $PEG_{45}$-b-$PAA_{69}$ were partially deprotonated and the amine groups of organic molecule 1 were partially protonated (Liu Z R, et al., *Anal. Biochem.* 1996, 236, 139). $PEG_{45}$-b-$PAA_{69}$ interacted with organic molecule 1 via an electrostatic attraction. After incubation for 1 day, the obtained two-component supramolecular polymers were nanofibers with an average diameter of 21 nm and an average length of approximately 700 nm as confirmed under the TEM observation (FIG. 34). An aqueous solution containing 0.18 mM organic molecule 1 only at pH 6.1 could not form nanofibers.

6.2 Supramolecular Polymerization of the Two-Component System Involving Organic Molecule 2 and $PEG_{45}$-b-$PAA_{69}$ (Entry No. 19 in Table 1)

Supramolecular polymerization of Organic Molecule 2 and $PEG_{45}$-b-$PAA_{69}$ was performed by mixing them in an aqueous solution. The concentrations of Organic Molecule 2 and carboxylic acid in the mixture are 0.28 mM and 1 mM, respectively. The pH value of the mixture was 5. After standing at room temperature for 1 day, the two-component supramolecular polymers obtained were nanofibers with an average diameter of 23 nm and a length of approximately 1 µm (FIG. 35).

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It is understood that the disclosed method and compositions are not limited to the particular methodology, protocols, and reagents described as these may vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a", "an", and "the" include plural reference unless the context clearly dictates otherwise. Thus, for example, reference to "a small molecule" includes a plurality of such small molecule, reference to "the small molecule" is a reference to one or more small molecules and equivalents thereof known to those skilled in the art, and so forth.

Throughout the description and claims of this specification, the word "comprise" and variations of the word, such as "comprising" and "comprises," means "including but not limited to," and is not intended to exclude, for example, other additives, components, integers or steps.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. It should be understood that all of the individual values and sub-ranges of values contained within an explicitly disclosed range are also specifically contemplated and should be considered disclosed unless the context specifically indicates otherwise. Finally, it should be understood that all ranges refer both to the recited range as a range and as a collection of individual numbers from and including the first endpoint to and including the second endpoint. In the latter case, it should be understood that any of the individual numbers can be selected as one form of the quantity, value, or feature to which the range refers. In this way, a range describes a set of numbers or values from and including the first endpoint to and including the second endpoint from which a single member of the set (i.e. a single number) can be selected as the quantity, value, or feature to which the range refers. The foregoing applies regardless of whether in particular cases some or all of these embodiments are explicitly disclosed.

Unless defined otherwise, all technical and scientific terms used herein have the same meanings as commonly understood by one of skill in the art to which the disclosed method and compositions belong. Although any methods and materials similar or equivalent to those described herein can be used in the practice or testing of the present method and compositions, the particularly useful methods, devices, and materials are as described. Publications cited herein and the material for which they are cited are hereby specifically incorporated by reference. Nothing herein is to be construed as an admission that the present invention is not entitled to antedate such disclosure by virtue of prior invention. No admission is made that any reference constitutes prior art. The discussion of references states what their authors assert, and applicants reserve the right to challenge the accuracy and pertinence of the cited documents. It will be clearly understood that, although a number of publications are referred to herein, such reference does not constitute an admission that any of these documents forms part of the common general knowledge in the art.

Those skilled in the art will recognize, or be able to ascertain using no more than routine experimentation, many equivalents to the specific embodiments of the method and compositions described herein. Such equivalents are intended to be encompassed by the following claims.

We claim:

1. A supramolecular polymer having active ends for propagation or elongation, comprising
a plurality of first small-molecule components, wherein the first small-molecule components have a planar or linear geometry, wherein the first small molecule components are solvophobic, and wherein the first small-molecule components are associated with one another non-covalently based on interactions comprising metal-metal interactions, π-π interactions electrostatic attractions, hydrogen-bonding interactions, solvophobic-solvophobic interactions, or a combination thereof; and
a polymer component, wherein the polymer component is solvophilic, and wherein the polymer component is in a non-covalent interaction with some or all of the first small-molecule components,
wherein the supramolecular polymer has a nanostructure, wherein the nanostructure is in a form comprising nanofibers, nanorods, nano-belts, nano-ribbons, or nano-wires, and
wherein the supramolecular polymer has active ends, wherein the active ends are capable of being propagated or elongated by addition of a plurality of second small-molecule components, wherein the second small-molecule components have a planar or linear geometry, wherein the second small molecule components are solvophobic, wherein the second small-molecule components are associated with one another non-covalently based on interactions comprising metal-metal interactions, π-π interactions, electrostatic attractions, hydrogen-bonding interactions, solvophobic-solvophobic interactions, or a combination thereof, and wherein the second small-molecule components can be the same as or different from the first small-molecule components.

2. The supramolecular polymer of claim 1, wherein the supramolecular polymer has a core-shell structure, wherein the shell comprises at least a portion of the polymer component and the core comprises the first small-molecule components.

3. The supramolecular polymer of claim 1, wherein the first small-molecule components comprise metal complexes of a square-planar configuration, wherein the metal complex is defined by the following formula,

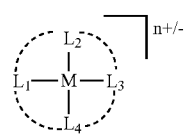

wherein:
(a) M is Ni(II), Pd(II), Pt(II), Rh(I), Ir(I), Au(III), Zn(II), or Cu(II);
(b) $L_1$, $L_2$, $L_3$, and $L_4$ represent ligands with donor atoms independently selected from N, C, O, S, Se, P, and As;
(c) dashed lines represent optional covalent linkages between neighboring ligands; and
(d) n+/− represents the number of positive charges or negative charges carried by the metal complexes, and n is selected from 0, 1, 2, 3, 4, 5, and 6.

4. The supramolecular polymer of claim 1, wherein the first small-molecule components comprise metal complexes of a trigonal-planar configuration, wherein the metal complex is defined by the following formula,

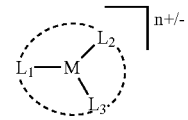

wherein:
(a) M is Cu(I), Ag(I), Au(I), Ni(0), Pd(0), Pt(0), Zn(II), Cd(II), or Hg(II);
(b) $L_1$, $L_2$, and $L_3$ represent ligands with donor atoms independently selected from N, C, O, S, Se, P, and As;
(c) dashed lines represent optional covalent linkages between neighboring ligands; and
(d) n+/− represents the number of positive charges or negative charges carried by the metal complexes, and n is selected from 0, 1, 2, 3, 4, 5, and 6.

5. The supramolecular polymer of claim 1, wherein the first small-molecule components comprise metal complexes of a linear configuration, wherein the metal complex is defined by the following formula,

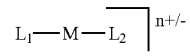

wherein:
(a) M is Cu(I), Ag(I), Au(I), Ni(0), Pd(0), Pt(0), Zn(II), Cd(II) or Hg(II);
(b) $L_1$ and $L_2$ represent ligands with donor atoms independently selected from N, C, O, S, Se, P, and As; and
(c) n+/− represents the number of positive charges or negative charges carried by the metal complexes, and n is selected from 0, 1, 2, 3, 4, 5, and 6.

6. The supramolecular polymer of claim 1, wherein the first small-molecule components comprise planar organic molecules that are positively charged, negatively charged, or charge-neutral.

7. The supramolecular polymer of claim 1, wherein the first small-molecule components comprise an alkynylplatinum(II) terpyridine complex defined by the following formula,

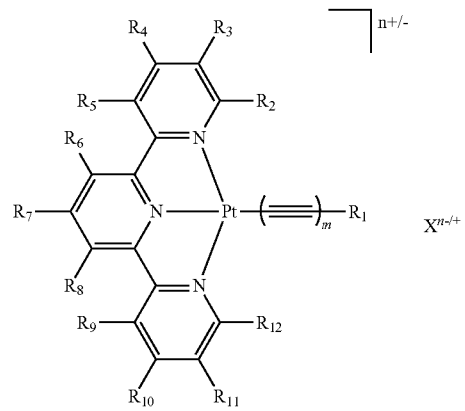

wherein

R₁ is H, or substituted, unsubstituted, or heteroatom-containing $C_1$-$C_{30}$ alkyl, $C_2$-$C_{30}$ alkenyl, $C_3$-$C_{30}$ aryl, $C_3$-$C_{30}$ heteroaryl, $C_1$-$C_{30}$ alkoxy, $C_3$-$C_{30}$ aryloxy, $C_3$-$C_{30}$ arylthio, $C_1$-$C_{30}$ alkylthio, $C_2$-$C_{30}$ carbonyl, $C_1$-$C_{30}$ carboxyl, amino, amido, or polyaryl;

m is an integer between 1 and 20;

$R_2$, $R_3$, $R_4$, $R_5$, $R_6$, $R_7$, $R_8$, $R_9$, $R_{10}$, $R_{11}$ and R12 are, independently, H, $C_1$-$C_{30}$ alkyl, $C_2$-$C_{30}$ alkenyl, $C_2$-$C_{30}$ alkynyl, $C_3$-$C_{30}$ aryl, or N-substituted amide;

n+/− represents the number of positive charges or negative charges carried by the metal complexes, and n is selected from 0, 1, 2, 3, 4, 5 and 6; and $X^{n-}$ is an anion comprising a chloride (Cr), nitrate ($NO_3^-$), triflate (OTf⁻), hexafluorophosphate ($PF_6^-$), perchlorate ($ClO_4^-$), tetrafluoroborate ($BF_4^-$), or tetraphenylboronate ($BPh_4^-$); and $X^{n+}$ is a cation comprising a $Na^+$, $K^+$, $Ca^{2+}$, $Mg^{2+}$, bis(triphenylphosphine) iminium ($PPN^+$), quaternary ammonium cation, pyridinium cation or a phosphonium cation.

8. The supramolecular polymer of claim 1, wherein the first small-molecule components comprise a platinum(II) 2,6-bis(benzimidazol-2′-yl)pyridine complex defined by the following formula,

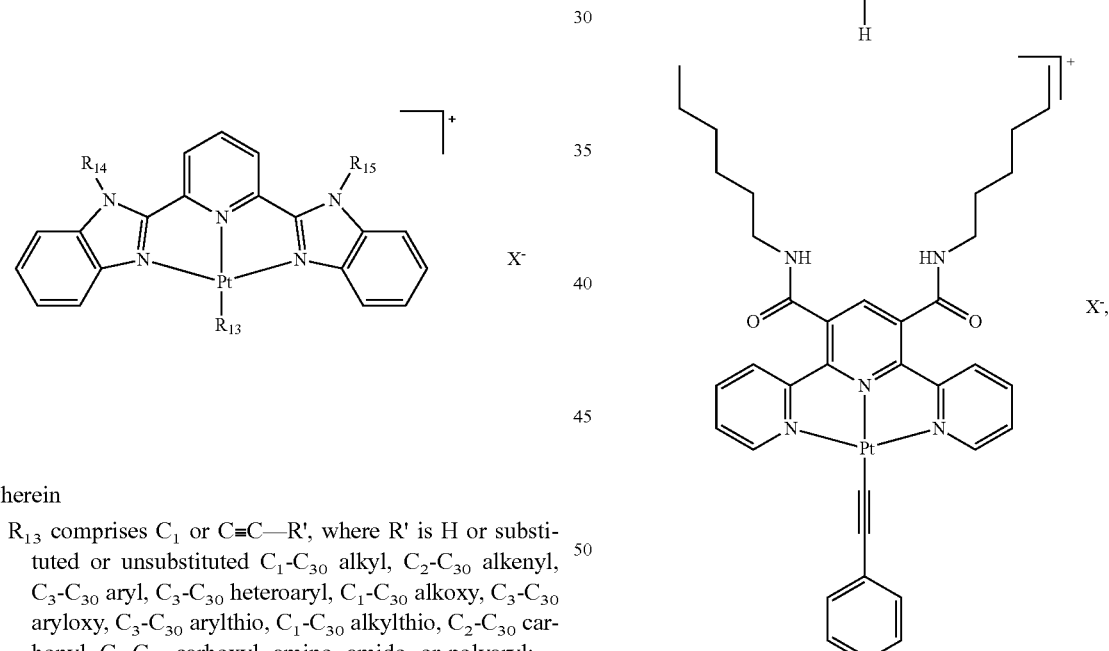

wherein $R_{13}$ comprises $C_1$ or C≡C—R′, where R′ is H or substituted or unsubstituted $C_1$-$C_{30}$ alkyl, $C_2$-$C_{30}$ alkenyl, $C_3$-$C_{30}$ aryl, $C_3$-$C_{30}$ heteroaryl, $C_1$-$C_{30}$ alkoxy, $C_3$-$C_{30}$ aryloxy, $C_3$-$C_{30}$ arylthio, $C_1$-$C_{30}$ alkylthio, $C_2$-$C_{30}$ carbonyl, $C_1$-$C_{30}$ carboxyl, amino, amido, or polyaryl;

$R_{14}$ and $R_{15}$ are independently H or substituted or unsubstituted $C_1$-$C_{30}$ alkyl, $C_2$-$C_{30}$ alkenyl, $C_2$-$C_{30}$ alkynyl, $C_3$-$C_{30}$ aryl, $C_3$-$C_{30}$ heteroaryl, $C_1$-$C_{30}$ alkoxy, $C_3$-$C_{30}$ aryloxy, $C_3$-$C_{30}$ arylthio, $C_1$-$C_{30}$ alkylthio, $C_2$-$C_{30}$ carbonyl, $C_1$-$C_{30}$ carboxyl, amino, amido, or polyaryl; and X⁻ is an anion comprising chloride, nitrate, triflate, hexafluorophosphate, perchlorate, tetrafluoroborate, or tetraphenylboronate.

9. The supramolecular polymer of claim 1, wherein the first small-molecule components are selected from the group consisting of

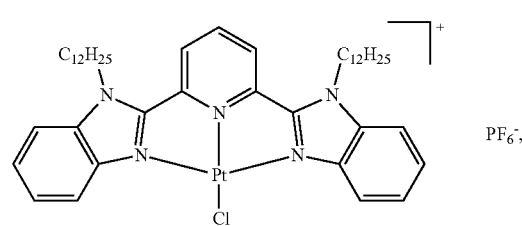

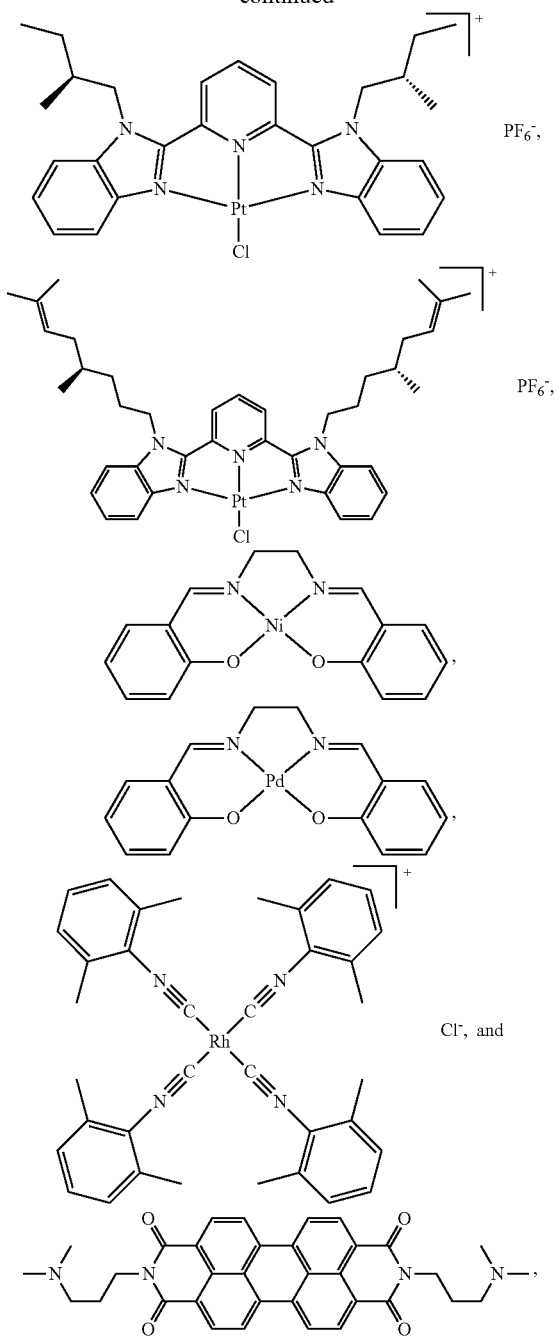

wherein X⁻ is an anion comprising chloride, nitrate, triflate, hexafluorophosphate, perchlorate, tetrafluoroborate, or tetraphenylboronate.

10. The supramolecular polymer of claim 1, wherein the polymer component comprises a block copolymer, wherein at least one block is a polymer selected from a group consisting of poly(acrylic acid), poly(acrylate), poly(methacrylic acid), poly(methacrylate), poly(acrylamide), poly(methacrylamide), poly(alkylene oxide), polyphosphite, polyphosphonate, polyphosphate, polyphosphoramidate, poly(carbonate), poly(ester), poly(anhydride), poly(urethane), poly(diene), poly(acetylene), poly(alkene), poly(vinyl ether), poly(vinyl alcohol), poly(vinyl ketone), poly(vinyl halide), poly(vinyl nitrite), poly(vinyl ester), poly(styrene), poly(vinyl pyridine), quaternized poly(vinyl pyridine), polyethylenimine, poly(lysine), polyphosphonium, polysulfonium, poly(amide), poly(amino acid), poly(lactic acid), poly(saccharide), DNA, RNA, poly(aromatic sulfonate), quaternized poly(arylamine), polyvinylpyrrolidone, poly(ethylene glycol), poly(alkylaminoacrylate), and derivatives thereof, and copolymers thereof.

11. The supramolecular polymer of claim 10, wherein the polymer component is a poly(ethylene glycol)-b-poly(acrylic acid).

12. The supramolecular polymer of claim 1, wherein the polymer component comprises an amphiphilic polymeric surfactant comprising poly(acrylic acid), poly(acrylate), poly(methacrylic acid), poly(methacrylate), poly(acrylamide), poly(methacrylamide), poly(oxide), polyphosphite, polyphosphonate, polyphosphate, polyphosphoramidate, poly(carbonate), poly(ester), poly(anhydride), poly(urethane), poly(diene), poly(acetylene), poly(alkene), poly(vinyl ether), poly(vinyl alcohol), poly(vinyl ketone), poly(vinyl halide), poly(vinyl nitrite), poly(vinyl ester), poly(styrene), poly(vinyl pyridine), quaternized poly(vinyl pyridine), polyethylenimine, poly(lysine), polyphosphonium, polysulfonium, poly(amide), poly(amino acid), poly(lactic acid), poly(saccharide), DNA, RNA, poly(aromatic sulfonate), quaternized poly(arylamine), polyvinylpyrrolidone, poly(ethylene glycol), poly(alkylaminoacrylate), copolymers thereof, solvophobically modified derivatives thereof, or hydrophobically modified derivatives thereof.

13. The supramolecular polymer of claim 1, wherein the first small-molecule components and the polymer component have a range of molar ratio between about 0.005:1 and about 50:1.

14. A method comprising incubating, in a solvent, first small-molecule components and a polymer component for a period of time effective to induce formation of supramolecular polymers,
wherein the first small-molecule components have a planar or linear geometry, wherein the first small molecule components are solvophobic, and wherein the first small-molecule components associate with one another non-covalently based on interactions comprising metal-metal interactions, π-π interactions, electrostatic attractions, hydrogen-bonding interactions, solvophobic-solvophobic interactions, or a combination thereof,
wherein the polymer component is solvophilic, and wherein the polymer component interacts with some or all of the first small-molecule components non-covalently to stabilize the formed supramolecular polymers, and
wherein the formed supramolecular polymers have active ends capable of propagation or elongation upon addition of additional small-molecule components.

15. The method of claim 14, wherein the formed supramolecular polymers have one or more nanostructures, wherein the nanostructure is in a form comprising nanofibers, nanorods, nano-belts, nano-ribbons, or nano-wires.

16. The method of claim 14, wherein the formed supramolecular polymers have a core-shell structure, wherein the shell comprises at least a portion of the polymer component and the core comprises the first small-molecule components.

17. The method of claim 14, wherein the first small-molecule components comprise metal complexes of a square-planar configuration, defined by the following formula,

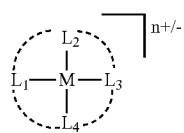

wherein:
(a) M is Ni(II), Pd(II), Pt(II), Rh(I), Ir(I), Au(III), Zn(II), or Cu(II);
(b) $L_1$, $L_2$, $L_3$, and $L_4$ represent ligands with donor atoms independently selected from N, C, O, S, Se, P, and As;
(c) dashed lines represent optional covalent linkages between neighboring ligands; and
(d) n+/− represents the number of positive charges or negative charges carried by the metal complexes, and n is selected from 0, 1, 2, 3, 4, 5, and 6.

18. The method of claim 14, wherein the first small-molecule components comprise metal complexes of a trigonal-planar configuration, defined by the following formula,

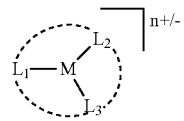

wherein:
(a) M is Cu(I), Ag(I), Au(I), Ni(0), Pd(0), Pt(0), Zn(II), Cd(II), or Hg(II);
(b) $L_1$, $L_2$, and $L_3$ represent ligands with donor atoms independently selected from N, C, O, S, Se, P, and As;
(c) dashed lines represent optional covalent linkages between neighboring ligands; and
(d) n+/− represents the number of positive charges or negative charges carried by the metal complexes, and n is selected from 0, 1, 2, 3, 4, 5, and 6.

19. The method of claim 14, wherein the first small-molecule components comprise metal complexes of a linear configuration, defined by the following formula,

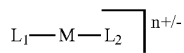

wherein:
(a) M is Cu(I), Ag(I), Au(I), Ni(0), Pd(0), Pt(0), Zn(II), Cd(II) or Hg(II);
(b) $L_1$ and $L_2$ represent ligands with donor atoms independently selected from N, C, O, S, Se, P, and As; and
(c) n+/− represents the number of positive charges or negative charges carried by the metal complexes, and n is selected from 0, 1, 2, 3, 4, 5, and 6.

20. The method of claim 14, wherein the first small-molecule components comprise planar organic molecules that are positively charged, negatively charged, or charge-neutral.

21. The method claim 14, wherein the polymer component comprises—a block copolymer, wherein at least one block is solvophilic and at least one block can bind to the first small-molecule components through non-covalent interactions selected from the group consisting of electrostatic attractions, hydrogen-bonding interactions, solvophobic-solvophobic interactions, and π-π interactions.

22. The method of claim 21, wherein the block copolymer comprises at least one block selected from the group consisting of poly(acrylic acid), poly(acrylate), poly(methacrylic acid), poly(methacrylate), poly(acrylamide), poly (methacrylamide), poly(alkylene oxide), polyphosphite, polyphosphonate, polyphosphate, polyphosphoramidate, poly(carbonate), poly(ester), poly(anhydride), poly(urethane), poly(diene), poly(acetylene), poly(alkene), poly(vinyl ether), poly(vinyl alcohol), poly(vinyl ketone), poly (vinyl halide), poly(vinyl nitrite), poly(vinyl ester), poly (styrene), poly(vinyl pyridine), quaternized poly(vinyl pyridine), polyethylenimine, poly(lysine), polyphosphonium, polysulfonium, poly(amide), poly(amino acid), poly (lactic acid), poly(saccharide), DNA, RNA, poly(aromatic sulfonate), quaternized poly(arylamine), polyvinylpyrrolidone, poly(ethylene glycol), poly(alkylaminoacrylate), and derivatives thereof, and copolymers thereof.

23. The method of claim 14, wherein the polymer component comprises an amphiphilic polymeric surfactant comprising poly(acrylic acid), poly(acrylate), poly(methacrylic acid), poly(methacrylate), poly(acrylamide), poly(methacrylamide), poly(oxide), polyphosphite, polyphosphonate, polyphosphate, polyphosphoramidate, poly(carbonate), poly (ester), poly(anhydride), poly(urethane), poly(diene), poly (acetylene), poly(alkene), poly(vinyl ether), poly(vinyl alcohol), poly(vinyl ketone), poly(vinyl halide), poly(vinyl nitrite), poly(vinyl ester), poly(styrene), poly(vinyl pyridine), quaternized poly(vinyl pyridine), polyethylenimine, poly(lysine), polyphosphonium, polysulfonium, poly (amide), poly(amino acid), poly(lactic acid), poly(saccharide), DNA, RNA, poly(aromatic sulfonate), quaternized poly(arylamine), polyvinylpyrrolidone, poly(ethylene glycol), poly(alkylaminoacrylate), copolymers thereof, solvophobically modified derivatives thereof, or hydrophobically modified derivatives thereof.

24. The method of claim 14, wherein the first small-molecule components and the polymer component in the solvent have a range of molar ratio between about 0.005:1 and about 50:1.

25. The method of claim 14, further comprising propagating or elongating the formed supramolecular polymers by incubating the additional small-molecule components with the formed supramolecular polymers,
wherein the additional small-molecule components have a planar or linear geometry and associate non-covalently with one another, with the first small-molecule components, or both, and
wherein the polymer component of the formed supramolecular polymers interacts with the additional small-molecule components.

26. The method of claim 25, wherein the additional small-molecule components are identical to the first small-molecule components.

27. The method of claim 25, wherein the additional small-molecule components are different from the first small-molecule components.

28. The method of claim 14, wherein the solvent comprises water.

29. The method of claim 14 further comprising fabricating aligned metal nanoparticles or nanowires using the formed supramolecular polymer as precursors.

30. The method of claim 14, wherein the polymer component is in excess after the supramolecular polymers are formed.

31. A multi-component supramolecular polymer comprising a plurality of supramolecular polymers, wherein the supramolecular polymers independently comprise a plurality of small-molecule components, wherein the small-molecule components have a planar or linear geometry, wherein the small molecule components are solvophobic, and wherein the small-molecule components are associated with one another non-covalently based on interactions comprising metal-metal interactions, π-π interactions, electrostatic attractions, hydrogen-bonding interactions, solvophobic-solvophobic interactions, or a combination thereof; and a polymer component, wherein the polymer component is solvophilic, and wherein the polymer component is in a non-covalent interaction with some or all of the small-molecule components, wherein the polymer component is the same among the supramolecular polymers and the small molecule components are the same or different among the supramolecular polymers, wherein the supramolecular polymers independently have a nanostructure with a plurality of ends, wherein the nanostructure is in a form comprising nanofibers, nanorods, nano-belts, nano-ribbons, or nano-wires, wherein the supramolecular polymers are associated with one another through a junction connecting (i) one of the ends from one supramolecular polymer in the plurality of supramolecular polymers and (ii) one of the ends from another supramolecular polymer in the plurality of supramolecular polymers.

\* \* \* \* \*